(12) United States Patent
Yamahara

(10) Patent No.: US 8,655,982 B2
(45) Date of Patent: Feb. 18, 2014

(54) INFORMATION SEARCHING APPARATUS, NUMBER DECIDING METHOD, INFORMATION SEARCHING PROGRAM, INFORMATION SEARCHING SYSTEM AND RECORDING MEDIUM

(75) Inventor: Hisanori Yamahara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 24 days.

(21) Appl. No.: 13/513,294

(22) PCT Filed: Dec. 24, 2010

(86) PCT No.: PCT/JP2010/073357
§ 371 (c)(1),
(2), (4) Date: Jun. 1, 2012

(87) PCT Pub. No.: WO2011/081096
PCT Pub. Date: Jul. 7, 2011

(65) Prior Publication Data
US 2012/0239781 A1      Sep. 20, 2012

(30) Foreign Application Priority Data

Dec. 28, 2009  (JP) ................................ 2009-297112
Dec. 28, 2009  (JP) ................................ 2009-297114

(51) Int. Cl.
*G06F 15/16*          (2006.01)

(52) U.S. Cl.
USPC ....................................................... 709/217

(58) Field of Classification Search
USPC .................. 709/200, 224, 226, 203, 217, 219
See application file for complete search history.

(56) References Cited

U.S. PATENT DOCUMENTS 6,070,160 A *   5/2000  Geary .................................. 1/1
6,078,914 A *   6/2000  Redfern .............................. 1/1
6,650,998 B1 * 11/2003  Rutledge et al. .............. 707/705

(Continued)

FOREIGN PATENT DOCUMENTS

JP         9-167130 A     6/1997
JP      2002-108933 A     4/2002

(Continued)

OTHER PUBLICATIONS

International Search Report for PCT/JP2010/073357 dated Feb. 1, 2011.

*Primary Examiner* — El Hadji Sall
(74) *Attorney, Agent, or Firm* — Sughrue Mion, PLLC

(57) ABSTRACT

There are provided an information searching apparatus, a number deciding method, an information searching program, an information searching system and a recording medium, in which a user can efficiently browse search results. A first data group constituted of a predetermined number of pieces of data is transmitted to a terminal device in a data group which is data corresponding to an searched information group, a transmission request of data different from the first data group is received from the terminal device, a second data group different from the first data group is transmitted to the terminal device in the data group corresponding to the searched information group, a presence of a user interest in the first data group is determined based on contents of a user operation detected by the terminal device after the first data group is transmitted until the transmission request is received, and when the user is not interested in the first data group, the second data group constituted of a larger number of pieces of data than the number of pieces of data constituting the first data group is transmitted.

18 Claims, 8 Drawing Sheets

(56) References Cited

U.S. PATENT DOCUMENTS

| | | | |
|---|---|---|---|
| 7,702,752 B2 * | 4/2010 | Kirsch et al. | 709/219 |
| 8,199,673 B2 * | 6/2012 | Narayanan et al. | 370/254 |
| 8,473,335 B2 * | 6/2013 | Deeming et al. | 705/14.26 |
| 2007/0085711 A1 * | 4/2007 | Bousquet et al. | 341/50 |
| 2008/0080311 A1 * | 4/2008 | Eperjesi et al. | 367/77 |
| 2010/0191826 A1 * | 7/2010 | Tsurukiri et al. | 709/217 |

FOREIGN PATENT DOCUMENTS

| | | |
|---|---|---|
| JP | 2005-63240 A | 3/2005 |
| JP | 2006-285704 A | 10/2006 |
| JP | 2007-34983 A | 2/2007 |
| JP | 2008-3721 A | 1/2008 |
| JP | 2009-157503 A | 7/2009 |

* cited by examiner

FIG.3

Search Result by Keyword "DIGITAL CAMERA"

Sort : Standard | Low Price | High Price | New Arrival | Number of Feedbacks
1~10 (10,000 results)  Next 1|2|3|4|5|6|7|8|9|10 ...

[Compare]

| Image | Product Name | Price | Shop Name | Compare |
|---|---|---|---|---|
| | xxxxxxxxxxxxx<br>Feedback (XX feedbacks) | ¥XXXX | xxxxxxx | ☐ |
| | xxxxxxxxxxxxx<br>Feedback (XX feedbacks) | ¥XXXX | xxxxxxx | ☐ |
| | xxxxxxxxxxxxx<br>Feedback (XX feedbacks) | ¥XXXX | xxxxxxx | ☐ |
| | xxxxxxxxxxxxx<br>Feedback (XX feedbacks) | ¥XXXX | xxxxxxx | ☐ |
| | xxxxxxxxxxxxx<br>Feedback (XX feedbacks) | ¥XXXX | xxxxxxx | ☐ |
| | xxxxxxxxxxxxx<br>Feedback (XX feedbacks) | ¥XXXX | xxxxxxx | ☐ |
| | xxxxxxxxxxxxx<br>Feedback (XX feedbacks) | ¥XXXX | xxxxxxx | ☐ |

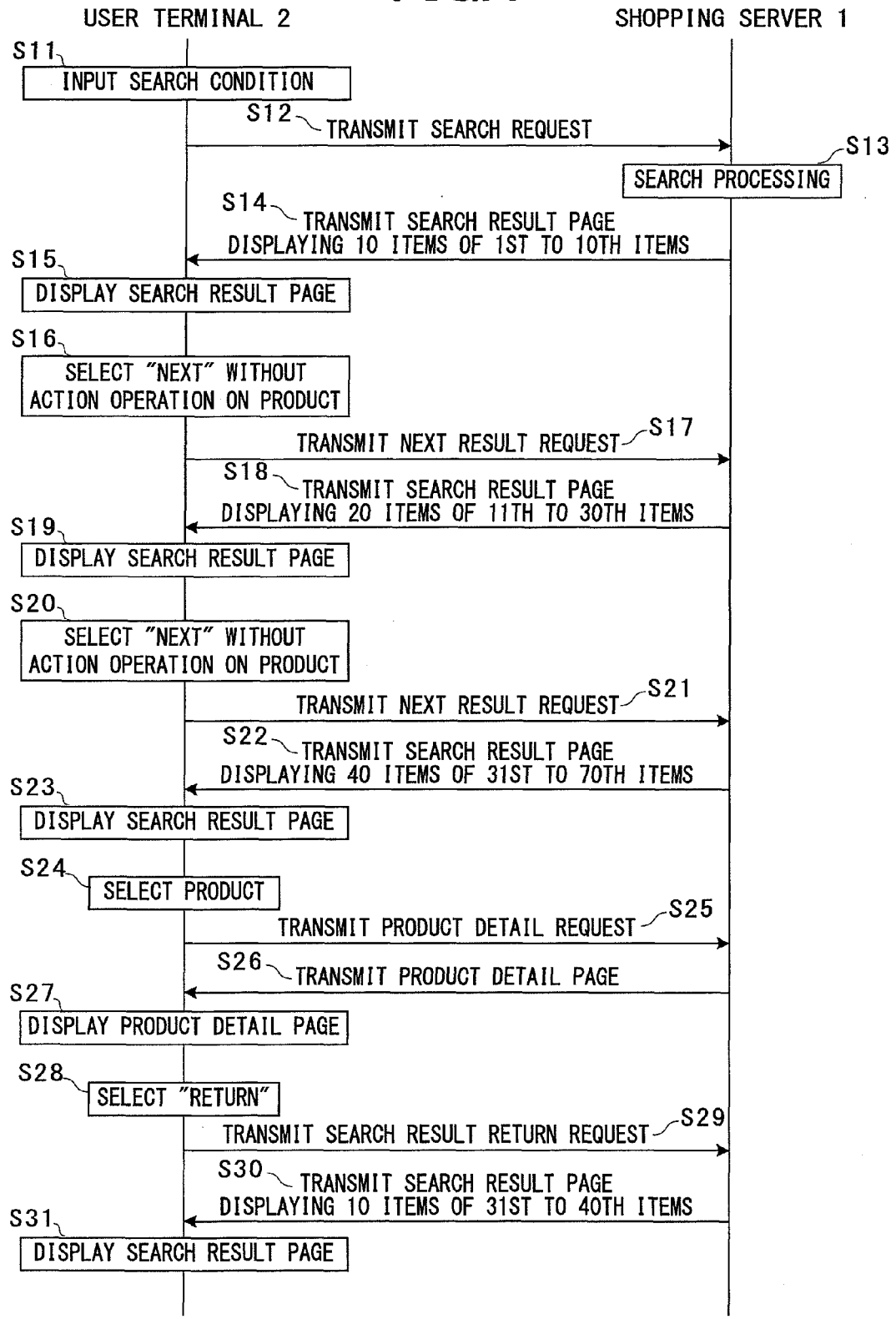

INFORMATION SEARCHING APPARATUS, NUMBER DECIDING METHOD, INFORMATION SEARCHING PROGRAM, INFORMATION SEARCHING SYSTEM AND RECORDING MEDIUM

CROSS REFERENCE TO RELATED APPLICATIONS

This application is a National Stage of International Application No. PCT/JP2010/073357 filed Dec. 24, 2010, claiming priority based on Japanese Patent Application Nos. 2009-297114 filed Dec. 28, 2009 and 2009-297112 filed Dec. 28, 2009, the contents of all of which are incorporated herein by reference in their entirety.

TECHNICAL FIELD

The present invention relates to a technical field of an information searching apparatus that searches information in response to a request from a terminal device, transmits search results to the terminal device via a network, and cause the terminal device to display the search results.

BACKGROUND ART

Conventionally, there is known an information searching apparatus that searches information in response to a request from a terminal device (for example, see Patent Document 1). The information searching apparatus transmits a Web page displaying a list of searched information as search results to a terminal device. The Web page transmitted from the information searching apparatus is displayed by the terminal device, so that a user can browse the search results.

The number of displays per search result page is previously set in a system or set by the user.

CITATION LIST

Patent Document

Patent Document 1: Japanese Patent Application Laid-Open No. 9-167130

SUMMARY OF THE INVENTION

Problems to be Solved by the Invention

Incidentally, when a user wants to browse further search results, the user selects a link indicating "next", for example. Then, a list different from a list of search results displayed so far is displayed. When the number of pieces of searched information is much more than the number of displays per page, the user may perform the above operation many times for finding information of interest or desired information.

The present invention has been made in view of the above problem, and an object thereof is to provide an information searching apparatus, a number deciding method, an information searching program, an information searching system, and a recording medium, in which a user can efficiently browse search results.

Means for Solving the Problems

In order to achieve the above object, the invention according to claim 1 relates to an information searching apparatus that searches information in response to a request from a terminal device and transmits search results to be displayed on the terminal device in unit of page to the terminal device via a network, comprising:

a search condition receiving means that receives a search condition transmitted from the terminal device;

a searching means that searches an information group meeting the search condition from a plurality of pieces of information for which data is stored in a data storage unit storing, in correspondence to each piece of the information, the data displayed as data about the information when the information is searched;

a first data transmitting means that transmits, to the terminal device, a first data group constituted of a predetermined number of pieces of the data in a data group which is the data corresponding to the information group searched by the searching means;

a data request receiving means that receives a transmission request of the data different from the first data group from the terminal device;

a second data transmitting means that transmits, to the terminal device, a second data group different from the first data group in the data group corresponding to the information group searched by the searching means in response to the transmission request received by the data request receiving means; and a determining means that determines a presence of a user interest in the first data group based on contents of a user operation detected by the terminal device after the first data group is transmitted until the transmission request is received, wherein when the determining means determines that the user is not interested in the first data group, the second data transmitting means transmits the second data group constituted of a larger number of pieces of the data than the number of pieces of the data constituting the first data group.

According to the present invention, the first data group is displayed for one page of search results on the terminal device. Thereafter, when the data different from the first data group is requested, the second data group is displayed for one page of search results on the terminal device. Then, the presence of the user interest in the first data group is determined based on the contents of the user operation detected by the terminal device until the transmission request is received after the first data group is transmitted.

In case where the data which the user is interested in or desires is not present in the data group displayed as the search results, it is inferred that the user tends to think that the possibility that the data which the user is interested in or desires is present in the data group to be displayed later is lower than in case where the data which the user is interested in or desires is present in the data group being currently displayed.

Thus, the second data group having a larger number of pieces than the number of search results displayed as the first data group is displayed as the next search results, thereby reducing the operations of requesting the data which the user is not interested in or the data which the user does not desire. Therefore, the user can efficiently browse the search results.

The invention according to claim 2 relates to the information searching apparatus according to claim 1, wherein the determining means determines whether a user operation on the data constituting the first data group is detected by the terminal device after the first data group is transmitted until the transmission request is received, and the second data transmitting means transmits the second data group constituted of a larger number of pieces of the data than the number of pieces of the data constituting the first data group when the determining means determines that the user operation is not detected.

According to the present invention, a determination is made as to whether the user operation on the data constituting the first data group is detected by the terminal device until the transmission request is received after the first data group is transmitted.

The fact that the user performs no operation on the data constituting the data group displayed as the search results may mean that the data which the user is interested in or desires is not present in the data group. In this case, it is inferred that the user tends to think that the possibility that the data which the user is interested in or desires is present in the data group to be displayed later is lower than in case where the data which the user is interested in or desires is present in the data group being currently displayed.

Thus, the second data group having a larger number of pieces than the number of search results displayed as the first data group is displayed as the next search results, thereby reducing the operations of requesting the data which the user is not interested or the data which the user does not desire. Therefore, the user can efficiently browse the search results.

The invention according to claim 3 relates to the information searching apparatus according to claim 1, wherein the determining means determines whether an elapsed time after the first data group is transmitted until the transmission request is received is equal to a predetermined threshold time or less, and the second data transmitting means transmits the second data group constituted of a larger number of pieces of the data than the number of pieces of the data constituting the first data group when the determining means determines that the elapsed time is equal to the threshold time or less.

According to the present invention, a determination is made as to whether the elapsed time until the transmission request is received after the first data group is transmitted is the predetermined threshold time or less.

In case where the elapsed time until the transmission request is received after the first data group is transmitted is the predetermined threshold time or less, it is assumed that the time for which the user is browsing the first data group as the search results is short. The fact that the time for which the data group displayed as the search results is being browsed is short may mean that the data which the user is interested in or desires is not present in the data group. In this case, it is inferred that the user tends to think that the possibility that the data which the user is interested in or desires is present in the data group to be displayed later is lower than in case where the data which the user is interested in or desires is present in the data group being currently displayed.

The second data group having a larger number of pieces than the number of search results displayed as the first data group is displayed as the next search results, thereby reducing the operations of requesting the data which the user is not interested in or the data which the user does not desire. Thus, the user can efficiently browse the search results.

The invention according to claim 4 relates to the information searching apparatus according to any one of claims 1 to 3, wherein the second data transmitting means increases the number of pieces of the data constituting the second data group by $\alpha$ pieces (where, $\alpha \geq 1$) more than the number of pieces of the data constituting the first data group when the determining means determines that the user is not interested in the first data group.

According to the present invention, the number of search results per page displayed on the terminal device increases by a predetermined number, thereby reducing the operations of requesting undesired data.

The invention according to claim 5 relates to the information searching apparatus according to claim 4, wherein the data request receiving means receives a transmission request of the data different from the transmitted second data group from the terminal device, the second data transmitting means transmits, as the new second data group, a data group different from the previously-transmitted second data group to the terminal device when the transmission request of the data different from the second data group is received, the determining means determines a presence of a user interest in the second data group based on contents of a user operation detected by the terminal device after the second data group is transmitted until the transmission request is received, and the second data transmitting means increases the number of pieces of the data constituting the second data group to be next transmitted by $\alpha$ pieces more than the number of pieces of the data constituting the previously-transmitted second data group when the determining means determines that the user is not interested in the second data group.

According to the present invention, the number of search results per page displayed on the terminal device increases in proportion to the number of transmissions of the transmission request, thereby reducing the operations of requesting undesired data.

The invention according to claim 6 relates to the information searching apparatus according to any one of claims 1 to 3, wherein the second data transmitting means increases the number of pieces of the data constituting the second data group by $\beta$ times (where, $\beta > 1$) more than the number of pieces of the data constituting the first data group when the determining means determines that the user is not interested in the first data group.

According to the present invention, the number of search results per page displayed on the terminal device multiplies by predetermined times, thereby reducing the operations of requesting undesired data.

The invention according to claim 7 relates to the information searching apparatus according to claim 6, wherein the data request receiving means receives a transmission request of the data different from the transmitted second data group from the terminal device, the second data transmitting means transmits, as the new second data group, a data group different from the previously-transmitted second data group to the terminal device when the transmission request of the data different from the second data group is received, the determining means determines a presence of a user interest in the second data group based on contents of a user operation detected by the terminal device after the second data group is transmitted until the transmission request is received, and the second data transmitting means increases the number of pieces of the data constituting the second data group to be next transmitted by $\beta$ times more than the number of pieces of the data constituting the previously-transmitted second data group when the determining means determines that the user is not interested in the second data group.

According to the present invention, the number of search results per page displayed on the terminal device exponentially increases depending on the number of transmissions of the transmission request, thereby reducing the operations of requesting undesired data.

The invention according to claim 8 relates to the information searching apparatus according to any one of claims 1 to 7, further comprising:

a sort condition receiving means that receives a sort condition transmitted from the terminal device; and a sorting means that sorts an arrangement order of the information in the information group searched by the searching means under the sort condition, wherein the second data transmitting means assumes, as the second data group, a data group of which the arrangement order of the information sorted by the sorting means is successive to that of the first data group.

According to the present invention, the search results of the information of which the contents of the sort reference item under the sort condition are the same or relatively close are collectively displayed as the data group on the terminal device. The data groups of which an arrangement order of information are successive have similar contents of the item as compared with the data groups of which an arrangement order of information is not successive. Thus, since the contents of the item of the data group displayed next to the data group displayed as the search results are closer to the contents of the item of the previously-displayed data group, in case where the data which the user is interested in or desires is not present in the data group being currently displayed, it is inferred that the possibility that the data which the user is interested in or desires is not present in the data group to be next displayed further increases. Therefore, the operations of requesting undesired data can be further reduced.

The invention according to claim 9 relates to the information searching apparatus according to claim 8, wherein the searching means searches product information, and the sort condition is an ascending order of product price.

According to the present invention, since the data group is displayed in ascending order of product price, the user who searches the product information with reference to a low price can further reduce the operations of requesting undesired data.

The invention according to claim 10 relates to the information searching apparatus according to claim 8, wherein the searching means searches product information, and the sort condition is a descending order of product price.

According to the present invention, since the data group is displayed in descending order of product price, the user who searches the product information with reference to a high price can further reduce the operations of requesting undesired data.

The invention according to claim 11 relates to the information searching apparatus according to any one of claims 1 to 3 and 8 to 10, wherein the data request receiving means receives a transmission request of the data different from the transmitted second data group from the terminal device, the second data transmitting means transmits, as the new second data group, a data group different from the previously-transmitted second data group to the terminal device when the transmission request of the data different from the second data group is received, the determining means determines a presence of a user interest in the second data group based on contents of a user operation detected by the terminal device after the second data group is transmitted until the transmission request is received, and the second data transmitting means increases the number of pieces of the data constituting the second data group to be next transmitted more than the number of pieces of the data constituting the previously-transmitted second data group when the determining means determines that the user is not interested in the second data group.

According to the present invention, the number of search results per page gradually increases, thereby reducing the operations of requesting undesired data.

The invention according to claim 12 relates to the information searching apparatus according to claim 2, wherein the data request receiving means receives a transmission request of the data different from the transmitted second data group from the terminal device, the second data transmitting means transmits, as the new second data group, a data group different from the previously-transmitted second data group to the terminal device when the transmission request of the data different from the second data group is received, the determining means determines whether a user operation on the data constituting the second data group is detected by the terminal device after the second data group is transmitted until the transmission request is received, and the second data transmitting means increases the number of pieces of the data constituting the second data group to be next transmitted more than the number of pieces of the data constituting the previously-transmitted second data group when the determining means determines that the user operation on the data constituting the second data group is not detected, the information searching apparatus further comprising:

an information display request receiving means that, when an information display request is transmitted from the terminal device in response to the detected user operation of displaying the information corresponding to the data constituting the second data group, receives the information display request;

an information transmitting means that transmits the information corresponding to the data selected by the user operation to the terminal device in response to the information display request received by the information display request receiving means; and a return request receiving means that receives a return request of returning to the display of the search results from the terminal device having received the information transmitted from the information transmitting means, wherein the second data transmitting means transmits the second data group constituted of a number of pieces of the data equal to or less than the number of pieces of the data constituting the first data group in response to the return request received by the return request receiving means.

According to the present invention, when the operation of displaying the information corresponding to the data constituting the second data group as the search results displayed on the terminal device is performed, the information is displayed on the terminal device.

It can be assumed that because of the user's interest or desire, the user selects the data and displays the information. In this case, it is inferred that the user tends to think that the possibility that the data which the user is interested in or desires is present in the data which the user has not selected yet among the previously-displayed second data group is higher than in case where the user does not perform the operation.

Even when the number of search results per page temporarily increases, if it returns to the display of the search results after the information corresponding to the data constituting the data group displayed as the search results is displayed, the number of displays per page is equal to or less than the number of pieces of data constituting the first data group so that the data group which the user is likely to be interested in or desire can be easily browsed.

The invention according to claim 13 relates to the information searching apparatus according to claim 3, wherein the data request receiving means receives a transmission request of the data different from the transmitted second data group from the terminal device, the second data transmitting means transmits, as the new second data group, a data group different from the previously-transmitted second data group to the terminal device when the transmission request of the data different from the second data group is received, the determining means determines whether an elapsed time after the second data group is transmitted until the transmission request is received is a predetermined threshold time or less, the second data transmitting means increases the number of pieces of the data constituting the second data group to be next transmitted more than the number of pieces of the data constituting the previously-transmitted second data group when the determining means determines that the elapsed time after the second data group is transmitted until the transmission request is received is equal to the predetermined threshold time or less, and the determining means makes a determination with longer threshold time as the number of pieces of the second data group transmitted by the second data transmitting means becomes larger.

According to the present invention, as the user's browsing time changes depending on the number of search results, a determination can be accurately made as to whether to increase the number of displays.

The invention according to claim 14 relates to the information searching apparatus according to claim 3 or 13, wherein the elapsed time is a time obtained by assuming a time when the first data transmitting means transmits a first data group to the terminal device as a time when the first data group is transmitted.

The invention according to claim 15 relates to the information searching apparatus according to any one of claims 3, 13 and 14, wherein the elapsed time is a time obtained by assuming a time when the terminal device having received the first data group completes a processing of displaying the first data group as a time when the first data group is transmitted.

According to the present invention, the time for which the user is browsing the data group as the search results can be more accurately determined.

The invention according to claim 16 relates to a number deciding method, for deciding the number of search results per page, in an information searching apparatus for searching information in response to a request from a terminal device and transmitting the search results to be displayed on the terminal device in units of page to the terminal device via a network, comprising:

a search condition receiving step of receiving a search condition transmitted from the terminal device;

a searching step of searching an information group meeting the search condition from a plurality of pieces of information for which data is stored in a data storage unit storing, in correspondence to each piece of the information, the data displayed as data about the information when the information is searched;

a first data transmitting step of transmitting, to the terminal device, a first data group constituted of a predetermined number of pieces of the data in a data group which is the data corresponding to the information group searched in the searching step;

a data request receiving step of receiving a transmission request of the data different from the first data group from the terminal device;

a second data transmitting step of transmitting, to the terminal device, a second data group different from the first data group in the data group corresponding to the information group searched in the searching step in response to the transmission request received in the data request receiving step; and a determining step of determining a presence of a user interest in the first data group based on contents of a user operation detected by the terminal device after the first data group is transmitted until the transmission request is received, wherein when it is determined that the user is not interested in the first data group in the determining step, the second data group constituted of a larger number of pieces of the data than the number of pieces of the data constituting the first data group is transmitted in the second data transmitting step.

The invention according to claim 17 relates to an information searching program for causing a computer included in an information searching apparatus which searches information in response to a request from a terminal device and transmits search results to be displayed on the terminal device in units of page to the terminal device via a network to function as:

a search condition receiving means that receives a search condition transmitted from the terminal device;

a searching means that searches an information group meeting the search condition from a plurality of pieces of information for which data is stored in a data storage unit storing, in correspondence to each piece of the information, the data displayed as data about the information when the information is searched;

a first data transmitting means that transmits, to the terminal device, a first data group constituted of a predetermined number of pieces of the data in a data group which is the data corresponding to the information group searched by the searching means;

a data request receiving means that receives a transmission request of the data different from the first data group from the terminal device;

a second data transmitting means that transmits, to the terminal device, a second data group different from the first data group in the data group corresponding to the information group searched by the searching means in response to the transmission request received by the data request receiving means; and a determining means that determines a presence of a user interest in the first data group based on contents of a user operation detected by the terminal device after the first data group is transmitted until the transmission request is received, wherein when the determining means determines that the user is not interested in the first data group, the program causes the computer as the second data transmitting means to transmit the second data group constituted of a larger number of pieces of the data than the number of pieces of the data constituting the first data group.

The invention according to claim 18 relates to an information searching system comprising:

a terminal device;

an information searching apparatus which searches information in response to a request from the terminal device and transmits search results to be displayed on the terminal device in unit of page to the terminal device via a network; and a data storage unit which stores, in correspondence to each piece of the information, data displayed as data about the information when the information is searched, wherein the information searching apparatus comprises:

a search condition receiving means that receives a search condition transmitted from the terminal device;

a searching means that searches an information group meeting the search condition from a plurality of pieces of information for which the data is stored in the data storage unit;

a first data transmitting means that transmits, to the terminal device, a first data group constituted of a predetermined number of pieces of the data in a data group which is the data corresponding to the information group searched by the searching means;

a data request receiving means that receives a transmission request of the data different from the first data group from the terminal device;

a second data transmitting means that transmits, to the terminal device, a second data group different from the first data group in the data group corresponding to the information group searched by the searching means in response to the transmission request received by the data request receiving means;

an operation notification receiving means that receives an operation notification indicating that a user operation on the data constituting the first data group is detected by the terminal device from the terminal device; and a determining means that determines a presence of a user interest in the first data group based on contents of a user operation detected by the terminal device after the first data group is transmitted until the transmission request is received, and the terminal device comprises:

a search condition transmitting means that transmits the search condition to the information searching apparatus;

a first data receiving means that receives the first data group transmitted from the information searching apparatus;

a first displaying means that displays the first data group;

an operation detecting means that detects the user operation on the data constituting the first data group displayed by the first displaying means;

an operation notification transmitting means that transmits the operation notification to the information searching apparatus when the user operation is detected by the operation detecting means;

a data request transmitting means that transmits the transmission request to the information searching apparatus when a user operation of requesting to transmit the data different from the first data group is detected;

a second data receiving means that receives the second data group transmitted from the information searching apparatus; and a second displaying means that displays the second data group, wherein when the determining means determines that the user is not interested in the first data group, the second data transmitting means transmits the second data group constituted of a larger number of pieces of the data than the number of pieces of the data constituting the first data group.

The invention according to claim 19 relates to a recording medium in which an information searching program is computer-readably recorded, the program causing a computer included in an information searching apparatus which searches information in response to a request from a terminal device and transmits search results to be displayed on the terminal device in units of page to the terminal device via a network to function as:

a search condition receiving means that receives a search condition transmitted from the terminal device;

a searching means that searches an information group meeting the search condition from a plurality of pieces of information for which data is stored in a data storage unit storing, in correspondence to each piece of the information, the data displayed as data about the information when the information is searched;

a first data transmitting means that transmits, to the terminal device, a first data group constituted of a predetermined number of pieces of the data in a data group which is the data corresponding to the information group searched by the searching means;

a data request receiving means that receives a transmission request of the data different from the first data group from the terminal device;

a second data transmitting means that transmits, to the terminal device, a second data group different from the first data group in the data group corresponding to the information group searched by the searching means in response to the transmission request received by the data request receiving means; and a determining means that determines a presence of a user interest in the first data group based on contents of a user operation detected by the terminal device after the first data group is transmitted until the transmission request is received, wherein when the determining means determines that the user is not interested in the first data group, the program causes the computer as the second data transmitting means to transmit the second data group constituted of a larger number of pieces of the data than the number of pieces of the data constituting the first data group.

Effect of the Invention

According to the present invention, the second data group having a larger number of pieces than the number of search results displayed as the first data group is displayed as the next search results, thereby reducing the operations of requesting the data which the user is not interested in or the data which he does not desire. Therefore, the user can efficiently browse the search results.

BRIEF DESCRIPTION OF THE DRAWINGS

FIG. 3 is a diagram showing an example of screen display of a search result page on a user terminal 2;

FIG. 4 is a sequence diagram showing a processing example of the shopping system S according to the embodiment;

MODES FOR CARRYING OUT THE INVENTION

Hereinafter, embodiments of the present invention will be described below in detail with reference to the drawings. The embodiments described later are embodiments in which the present invention is applied to a shopping system by which products are sold and bought via electronic information exchange on a network.

First Embodiment

[1. Structure and Functional Outline of Shopping System]

First, a structure and schematic functions of a shopping system S according to the present embodiment will be described using FIG. 1.

Figure 1:
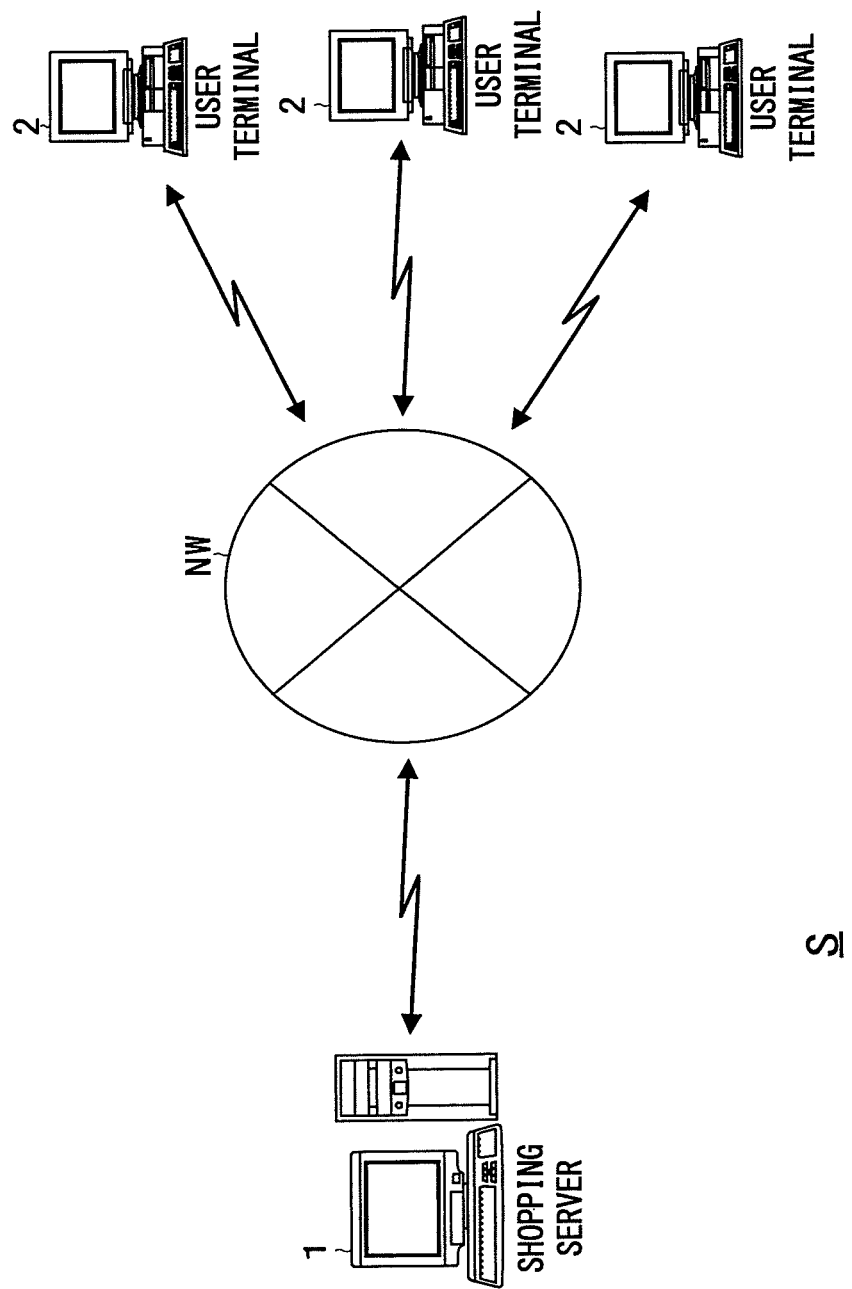
FIG. 1 is a diagram showing an example of a schematic structure of a shopping system S according to one embodiment.

FIG. 1 is a diagram showing an example of a schematic structure of the shopping system S according to the present embodiment.

As shown in FIG. 1, the shopping system S includes a shopping server 1 as an example of an information searching apparatus, and plural user terminals 2 as examples of terminal devices. The shopping server 1 and each user terminal 2 can mutually send and receive data by use of TCP/IP or the like as communication protocol via a network NW. Here, the network NW is constructed of, for example, Internet, a dedicated communication line (such as Community Antenna Television (CATV) line), a mobile communication network (including base station and the like) and a gateway and the like.

In the shopping system S with the structure, the shopping server 1 is a Web server for transmitting a Web page constituting a shopping site to the user terminal 2 in response to a request from the user terminal 2. Then, the shopping server 1 performs the processings of searching, purchasing a product and the like in response to a request from the user terminal 2 of the user having browsed the Web page.

The user terminal 2 is a terminal device used by the user who purchases a product on the shopping site. The user terminal 2 employs, for example, a personal computer, Personal Digital Assistant (PDA), a cell phone or the like.

[2. Structure of Shopping Server]

Nest, a structure and functions of the shopping server 1 will be described using FIG. 2.

Figure 2:
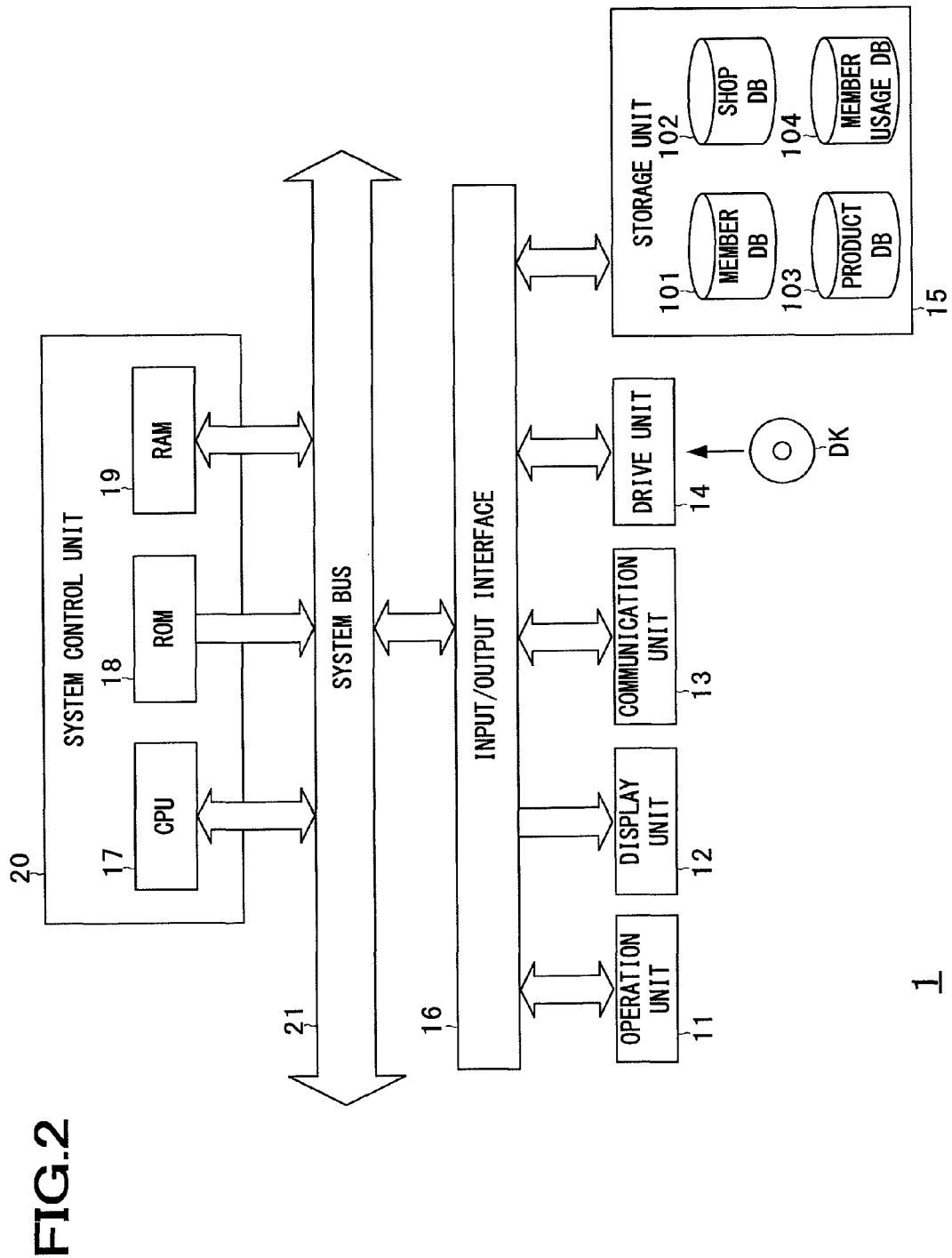
FIG. 2 is a block diagram showing an example of a schematic structure of a shopping server 1 according to the embodiment.

FIG. 2 is a block diagram showing an example of a schematic structure of the shopping server 1 according to the present embodiment.

As shown in FIG. 2, the shopping server 1 includes an operation unit 11, a display unit 12, a communication unit 13, a drive unit 14, a storage unit 15, an input/output interface unit 16, and a system control unit 20. The system control unit 20 and the input/output interface unit 16 are connected to each other via a system bus 21.

The operation unit 11 is configured of, for example, a keyboard, a mouse or the like, receives an operation instruction from an operator or the like and outputs the instruction contents as an instruction signal to the system control unit 20. The display unit 12 is configured of, for example, a Cathode Ray Tube (CRT) display, liquid crystal display or the like and displays information such as characters or images. The communication unit 13 is connected to the network NW and controls a communication state with the user terminal 2 and the like. The drive unit 14 reads data from a disc DK such as flexible disc, Compact Disc (CD) or Digital Versatile Disc (DVD) and records data on the disc DK. The storage unit 15 is configured of, for example, a hard disc or the like, stores various programs, data and the like. The input/output interface unit 16 performs an interface processing between the operation unit 11 to the storage unit 15 and the system control unit 20. The system control unit 20 is configured of a Central Processing Unit (CPU) 17, a Read Only Memory (ROM) 18, a RAM 19 and the like.

The storage unit 15 constitutes an example of a data storage unit in the present invention. In the storage unit 15, various databases such as a member DB (database) 101, a shop DB 102, a product DB 103 and a member usage DB 104 are constructed. In the member DB 101, information on users registered as members on the shopping site (such as member ID as member identification information, password, name, address, phone number, e-mail address and the like) is registered in association with each user. In the shop DB 102, information on shops selling products on the shopping site (such as shop ID as shop identification information, password, shop name, address, phone number, e-mail address and shop guidance information) is registered in association with each shop. In the product DB 103, information on products sold on the shopping site (such as shop ID of shop selling products, product ID as product identification information, product name, price, product explanatory information, product image, sales start date and product feedback) is registered in association with each shop and each product. The information registered in the product DB 103 is exemplary product information in the present invention. In the member usage DB 104, user information on usage of the shopping site (such as member ID, purchase history, browse history and favorite products' information) is registered per user.

Further, in the storage unit 15, various Hyper Text Markup Language (HTML) documents, image data, voice data, text data and the like constituting the Web page of the shopping site are stored.

Furthermore, in the storage unit 15, a predetermined operating system is stored. Further, in the storage unit 15, a World Wide Web (WWW) server program for, by use of a Hyper Text Transfer Protocol (HTTP), transmitting a Web page to the user terminal 2 or the like based on various pieces of data stored in the storage unit 15 in response to a request transmitted from the user terminal 2 or the like. Moreover, in the shopping server 1, a shopping processing program for performing the processings of searching and purchasing a product on the shopping site is stored. Incidentally, various programs may be obtained via the network NW from other server device or may be recorded in the disk DK such as CD-ROM and read via the drive unit 14.

The CPU 17 reads and executes various programs stored in the ROM 18 or the storage unit 15 so that the system control unit 20 controls each unit in the shopping server 1. Further, the system control unit 20 functions as a search condition receiving means, a searching means, a first data transmitting means, a data request receiving means, a second data transmitting means, a determining means, a sort condition receiving means, a sorting means, an information display request receiving means, an information transmitting means, a return request receiving means and an operation notification receiving means in the present invention.

The shopping server 1 may be configured of plural server devices such as a server for managing various databases, a search processing server for performing a product search processing and a WWW server for providing various pieces of information.

[3. Display of Search Results]

Next, a mode of displaying search results in the shopping system S when a product is searched will be described using FIGS. 3 and 4.

When the shopping server 1 searches products, the shopping server 1 transmits a Web page indicating a list of products meeting a search condition input by the user (which will be called "corresponding product" below) as search results to the user terminal 2. The Web page is called "search result page." FIG. 3 is a diagram showing an example of screen display of the search result page on the user terminal 2.

As shown in FIG. 3, the search result page displays a corresponding product list 201, a sort condition link group 202, an additional search result link group 203, a comparison button 204 and the like.

The product list 201 displays a list of products meeting the search condition. Specifically, the corresponding product list 201 includes plural pieces of single information 210. The single information 210 indicates information on one corresponding product. The single information 210 includes a product image, a product link 211, a feedback link 212, a product price, a shop link 213 and a check box 214. The product link 211 is a link (hyperlink) indicating a product name corresponding to the link. The feedback link 212 is a link indicating the number of feedbacks of the product registered by users who have purchased the product corresponding to the link. The shop link 213 is a link indicating the name of the shop selling the product corresponding to the link. The check box 214 is a check box for selecting a product to be compared when plural products are to be compared.

When the product link 211 is selected by the user, the display transits to a Web page displaying detailed information on the product corresponding to the link. The Web page is called "product detail page." The product detail page displays information such as product name, one or multiple product images, product explanation, product price, payment method, postage, shipment method and contact, for example.

When the feedback link 212 is selected by the user, the display transits to a Web page displaying feedbacks of the product corresponding to the link. The Web page is called "feedback detail page." The feedback detail page displays nickname of a poster who has posted a feedback, evaluation value, posting date, feedback and the like, for example.

When the shop link 213 is selected by the user, the display transits to a Web page displaying detailed information on the shops selling the product corresponding to the link. The Web page is called "shop detail page." The shop detail page displays shop name, shop guidance information, a link to product detail page of each product sold in shop, payment method, postage, shipment method and the like, for example.

The product detail page, the feedback detail page and the shop detail page are generated by the shopping server 1 based on the information registered in the shop DB 102 or the product DB 103 and are stored in the storage unit 15.

The sort condition link group 202 includes plural links by which the user selects a sort condition. The sort condition means a condition for sorting a priority by which the products meeting the search condition are displayed as the search results. The sort condition includes such as a standard, an ascending order of product price, a descending order of product price, an order of arrival or a descending order of the number of feedbacks, for example. The standard as the sort condition means to sort the corresponding products in order of search. When any link in the sort condition link group 202 is selected by the user, the priority of displaying the corresponding products is sorted under the sort condition corresponding to the selected link. Then, the corresponding products in a list displayed in the corresponding product list 201 are rearranged in the sorted priority.

The additional search result link group 203 includes plural links for transiting to a search result page displaying a list of products different from the list of products displayed in the current corresponding product list 201 among the products meeting the search condition. For example, when a link indicating a page number is selected by the user, the display transits to a search result page having the page number corresponding to the link. When a next result link 230 indicating "next" is selected by the user, the display transits to a search result page next to the currently-displayed search result page. For example, while the list of the corresponding products of the first item to the tenth item is being displayed, when the next result link 230 is selected, the display transits to a search result page displaying a list of the corresponding products subsequent to the tenth item. In this way, a list of the corresponding products having a successive priority to the corresponding products that are currently listed is displayed in the display priority sorted under the sort condition.

When the comparison button 204 is selected by the user, the display transits to a Web page displaying information on multiple products with the check boxes 214 checked. The Web page is called "comparison detail page." The comparison detail page displays a list of name, image, price, product explanation, shop name, postage, payment method and the like of the selected product, for example.

The product detail page, the feedback detail page, the shop detail page and the comparison detail page are collectively called "detail page." The detail page is a Web page displaying information on one or more products in the list of products displayed in the corresponding product list 201 and a Web page displaying at least one item of information not displayed in the single information 210.

When the entire search result page cannot be displayed in one screen, a scroll bar 300 is displayed on the screen of the user terminal 2. When the scroll bar 300 is operated, the search result page is scrolled and displayed. The scroll bar 300 itself does not constitute the search result page.

In the search result page, the number of corresponding products displayed in the corresponding product list 201 is called "the number of displays." An initial value of the number of displays is previously determined in the shopping system S. The initial value of the number of displays can be changed by a user setting.

When a product of interest or desired product is not present in the list of the corresponding products displayed in the search result page, the user selects the next result link 230 to display another list, for example. When the initial value of the number of displays remains unchanged, if the number of products meeting the search condition is significantly more than the number of displays, the user must select the next result link 230 many times until the user can find a product of interest or desired product. Since it takes time and effort to perform the selecting operation, efficiency in browsing the search results deteriorates.

In the shopping system S, when the user selects a link in the additional search result link group 203 without any action on the products which are listed, the number of displays increases. The actions on the products specifically include selection of the product link 211, selection of the feedback link 212, selection of the shop link 213 and selection of the comparison button 204. In other words, the actions on the products mean the operations associated with the list of products. Therefore, the actions on the products do not include operations irrelevant to the products such as selection of any link in the sort condition link group 202, selection of a link in the additional search result link group 203 and operation of scroll bar 300.

Some action on the list of products means that the user is interested in the action-subjected product or the product is the user-desired one. Conversely, no action on the list of products means that the user is not interested in the list of products or a user-desired product is not present therein. In this case, the user selects the next result link 230 to display a different list from the list displayed so far. At this time, it is inferred that the user tends to think that the possibility that a product which the user is interested in or desires is not present is higher than the possibility that the product is present. In the state of mind, it is inferred that the user tends to browse a list of products in a shorter time than initially. In such a case, if the number of displays increases, more pieces of information can be browsed in a short time. Further, the number of selections of the next result link 230 can be reduced.

When a product which the user is interested in or a product which the user desires is present in the displayed list of products, that is, when the user takes some action on the list of products, the user may further browse a list of products as the search results. In this case, it is inferred that the user tends to think that the possibility that another interesting product or another desired product is present is higher than the possibility that the product is not present. In the state of mind, it is inferred that the user tends to browse a list of products in the same time as initially or in a longer time than initially. In such a case, the number of displays does not need to be increased. This is because since the ratio of the time to select the next result link 230 decreases in the entire time required to browse the search results, it is assumed that no influence is caused even when the number of selections of the next result link 230 is not reduced. Further, when the user browses a list of products with time, it is assumed that the number of displays is not increased and accordingly the user can easily browse.

Next, the operational outline of the shopping system S for controlling the number of displays in a search result page will be described below.

FIG. 4 is a sequence diagram showing a processing example of the shopping system S according to the present embodiment. FIG. 4 shows a processing example when the initial value of the number of displays is 10 and the number of displays increases by twofold.

As shown in FIG. 4, the user inputs a search condition on the user terminal 2 (step S11). The search condition is, for example, a keyword, a range of product price, a category to which the product belongs, or the like. The sort condition may also be selected at this time. Then, the user terminal 2 transmits a search request including the input search condition to the shopping server 1 (step S12).

The shopping server 1 performs a search processing based on the search condition included in the received search request (step S13). Then, the shopping server 1 transmits a search result page displaying a list of ten corresponding products of the first item to the tenth item to the user terminal 2 (step S14). The user terminal 2 displays the received search result page (step S15).

When the user selects the next result link 230 without any action on the displayed list of the corresponding products (step S16), the user terminal 2 which has detected the operation transmits a next result request (an example of a transmission request in the present invention) to the shopping server 1 (step S17). Then, the shopping server 1 transmits a search result page displaying a list of 20 corresponding products of the 11th item to the 30th item to the user terminal 2 (step S18). The user terminal 2 displays the received search result page (step S19).

When the user selects the next result link 230 without any action on the displayed list of the corresponding products (step S20), the user terminal 2 which has detected the operation transmits a next result request to the shopping server 1 (step S21). Then, the shopping server 1 transmits a search result page displaying a list of 40 corresponding products of the 31st item to the 70th item to the user terminal 2 (step S22). The user terminal 2 displays the received search result page (step S23).

When the user selects the product link 211 of any product such as the 35th item from the corresponding product list 201 in the search result page (step S24), the user terminal 2 which has detected the operation transmits a product detail request to the shopping server 1 (step S25). Then, the shopping server 1 transmits a product detail page corresponding to the product detail request to the user terminal 2 (step S26). The user terminal 2 displays the received product detail page (step S27).

Here, when the user selects a button indicating "return" in the Web browser or a button indicating "return" in the product detail page (step S28), the user terminal 2 which has detected the operation transmits a search result return request (an example of a return request in the present invention) to the shopping server 1 (step S29). Then, the shopping server 1 transmits a search result page displaying a list of ten corresponding products of the 31st item to the 40th item to the user terminal 2 (step S30). In other words, the shopping server 1 returns the number of displays to the initial value. The user terminal 2 displays the received search result page (step S31). If the operation in step S28 is performed when the product link 211 of the 45th item is selected in step S24, the shopping server 1 transmits a search result page displaying a list of ten corresponding products of the 41st item to the 50th item to the user terminal 2 in step S30. Alternatively, if the operation in step S28 is conducted when the product link 211 of the 67th item is selected in step S24, the shopping server 1 transmits a list of ten corresponding products of the 61st item to the 70th item to the user terminal 2 in step S30.

A specific example of the search of a product will be described. It is assumed that the user searches a digital camera which meets the user's desired condition and whose price is as low as possible. In this case, the search condition is assumed as digital camera and the sort condition is assumed as ascending order of price. It is assumed that when search is performed under the condition, digital camera main bodies and digital camera accessories are included in the search results as the corresponding products. Here, it is assumed that the price of the digital camera accessory is lower than that of the digital camera main body. Thus, almost only the accessories are displayed in the early search result pages. Therefore, the user selects the next result link 230 to increase the number of displays of the corresponding product from ten items, 20 items, 40 items and so on. Then, when the desired digital camera can be found at the 67th item, the user browses the product detail page of the product. In this case, the number of user selections of the next result link 230 is two. On the other hand, if the number of displays remains unchanged at 10, the user must select the next result link 230 for six times.

As described above, since the number of displays gradually increases in the shopping system S, the number of selections of the link in the additional search result link group 203 can be reduced.

[4. Operations of Shopping System]

The operations of the shopping system S will be described using FIG. 5.

Figure 5:
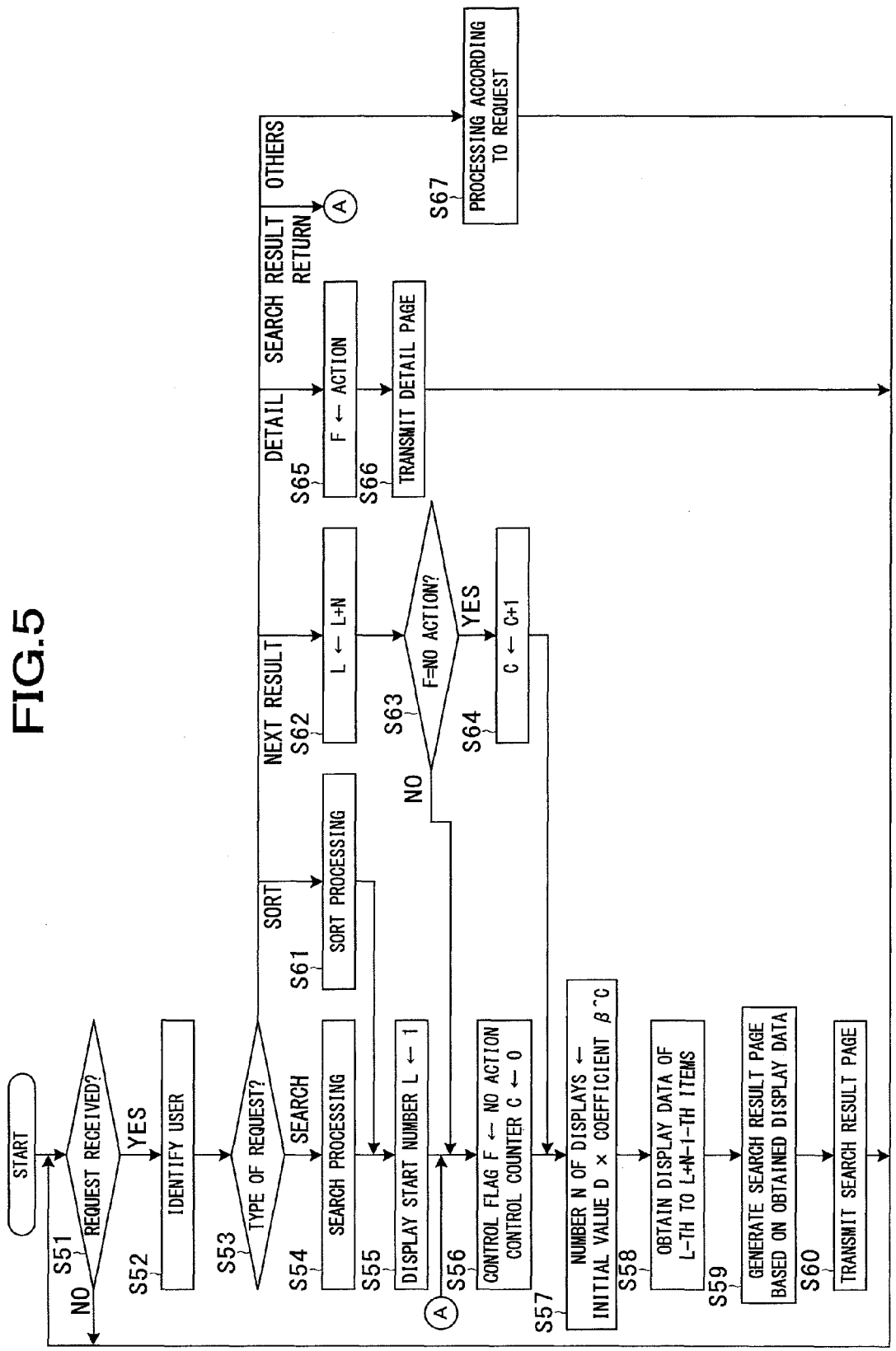
FIG. 5 is a flowchart showing a processing example of a system control unit 20 of the shopping server 1 according to the embodiment.

FIG. 5 is a flowchart showing a processing example of the system control unit 20 of the shopping server 1 according to the present embodiment. The processing in FIG. 5 starts, for example, when the shopping server 1 enters a state waiting for a request from the user terminal 2.

At first, the system control unit 20 determines whether the system control unit 20 has received a request from the user terminal 2 (step S51). At this time, when the system control unit 20 has not received a request (step S51: NO), the system control unit 20 performs the determination processing in step S51 again.

On the other hand, when the system control unit 20 has received a request from the user terminal 2 (step S51: YES), the system control unit 20 identifies the user of the user terminal 2 which has transmitted the received request (step S52). For example, the user previously operates the user terminal 2 to access the shopping server 1, and inputs his member ID and password thereby to log in the shopping site. In response to the login, the shopping server 1 issues a session ID to the user terminal 2 and manages various pieces of information including the member ID as session information in association with the session ID. Further, the shopping server 1 transmits the session ID as, for example, a cookie to the user terminal 2. Since the session ID is included in a subsequent request from the user terminal 2 to the shopping server 1, the system control unit 20 can identify from which user the request is.

After identifying the user, the system control unit 20 determines a type of the received request (step S53). At this time, when the received request is a search request (step S53: SEARCH), the system control unit 20 performs a search processing (step S54). Specifically, the system control unit 20 searches the product DB 103 based on the search condition included in the received search request. Then, the system control unit 20 extracts information such as product ID, price, sale start date, the number of feedbacks of the product meeting the search condition from the product DB 103. Then, the system control unit 20 generates a list of search results based on the extracted information and stores the list of search results in the storage unit 15 in association with the session ID. The information on the corresponding product is arranged in search order, for example, on the list of search results.

After finishing the search processing, the system control unit 20 initializes variables included in the session information of the identified user. Specifically, the system control unit 20 sets a display start number L to 1 (step S55). Further, the system control unit 20 sets a control flag F to "no action" and sets a control counter C to 0 (step S56). The display start number L indicates a product number of the head product in the list of the corresponding products in the search result page. The product number indicates a display priority when the search results are sorted. The smaller value of the number indicates the higher priority. The control flag F indicates whether the user has taken any action on the displayed list of the corresponding products. When no action has been taken, the control flag F is set to "no action", and when any action has been taken, the control flag F is set to "action". The control counter C indicates the number of transmissions of the next result request without any action on the displayed list of the corresponding products in the search result page.

After initializing the variables, the system control unit 20 calculates the number N of displays per search result page (step S57). Specifically, the system control unit 20 calculates the following equation (1).

$$N = D \times \beta^C \qquad (1)$$

Where D is the initial value of the number of displays. $\beta$ is a preset coefficient satisfying $\beta > 1$. The example of FIG. 4 is an example in the case of $\beta = 2$.

After calculating the number N of displays, the system control unit 20 obtains product display data of the L-th item to the L+N−1-th item (an example of data displayed when product information is searched in the present invention) from the shop DB 102 and the product DB 103 according to the display priority based on the product ID set in the generated list (step S58). The product display data is information displayed in the search result page, and is specifically image, product name, price, shop name and the like. Next, the system control unit 20 generates a HTML document of the search result page based on the obtained display data (step S59). Next, the system control unit 20 transmits the generated HTML document of the search result page to the user terminal 2 which has transmitted the request (step S60). After finishing the processing, the system control unit 20 proceeds to step S51.

In step S53, when the received request is a sort request (step S53: SORT), the system control unit 20 performs a sort processing (step S61). The sort request is transmitted from the user terminal 2 when a link in the sort condition link group 202 in the search result page is selected. The user-selected sort condition is set in the sort request. In the sort processing, the system control unit 20 sorts the information on the products set in the search result list under the sort condition included in the received sort request. In other words, the system control unit 20 rearranges the display priority of the corresponding products in the order indicated with the sort condition. After finishing the sort processing, the system control unit 20 proceeds to step S55. In other words, the system control unit 20 transmits a search result page displaying a list of the corresponding products of the first item to the D−1-th item sorted with a new sort condition to the user terminal 2.

In step S53, when the received request is a next result request (step S53: NEXT RESULT), the system control unit 20 adds the number N of displays to the display start number L (step S62). The next result request is transmitted from the user terminal 2 when the next result link 230 is selected.

Next, the system control unit 20 determines whether "no action" is set in the control flag F (step S63). At this time, when "action" is set in the control flag F (step S63: NO), the system control unit 20 proceeds to step S56. In other words, the system control unit 20 returns the number of displays per page to the initial value and transmits the search result page to the user terminal 2.

On the other hand, when "no action" is set in the control flag F (step S63: YES), the system control unit 20 adds 1 to the control counter C (step S64) and proceeds to step S57. In other words, the system control unit 20 increases the number of displays per page by $\beta$ times more than the last time and transmits the search result page to the user terminal 2.

In step S53, when the received request is a detail request (an example of an information display request in the present invention) (step S53: DETAIL), the system control unit 20 sets the control flag F to "action" (step S65). The detail request is a general term of the product detail request, the feedback detail request, the shop detail request and the comparison detail request. The product detail request is a request to be transmitted from the user terminal 2 when the product link 211 displayed in the search result page is selected. The feedback detail request is a request to be transmitted from the user terminal 2 when the feedback link 212 displayed in the search result page is selected. The shop detail request is a request to be transmitted from the user terminal 2 when the shop link 213 displayed in the search result page is selected. The comparison detail request is a request to be transmitted from the user terminal 2 when the comparison button 204 displayed in the search result page is selected.

Next, the system control unit 20 transmits the product detail page corresponding to the received request to the user terminal 2 which has transmitted the request (step S66). After finishing the processing, the system control unit 20 proceeds to step S51.

In step S53, when the received request is a search result return request (step S53: SEARCH RESULT RETURN), the system control unit 20 proceeds to step S56. The search result return request is a request to be transmitted from the user terminal 2 when the "return" button in the Web browser or the "return" button displayed in the detail page is selected while the detail page is being displayed on the screen. The system control unit 20 which has proceeded to step S55 returns the number of displays per page to the initial value and transmits the search result page to the user terminal 2.

In step S53, when the received request is not any of the search request, the sort request, the next result request, the detail request and the search result return request (step S53: OTHERS), the system control unit 20 performs a processing in response to the received request (step S67) and proceeds to step S51.

As described above, according to the present embodiment, the system control unit 20 of the shopping server 1 searches the information of the products meeting the search condition from among the information of the products including the display data, which is the information on plural products whose data are registered in the product DB 103 constructed in the storage unit 15, transmits the search result page displaying the display data for the number of pieces corresponding to the initial value of the number of displays among the display data corresponding to the information of the searched product to the user terminal 2, receives the next result request of requesting data other than the display data displayed in the search result page from the user terminal 2, and transmits the search result page displaying the display data different from the display data displayed in the previously-transmitted search result page to the user terminal in response to the next result request. Further, the system control unit 20 determines whether the user operation on the display data displayed in the previously-transmitted search result page is detected by the user terminal 2 after the search result page is transmitted until the next result request is received. Specifically, the system control unit 20 determines whether the system control unit 20 has received the detail request from the user terminal 2. The determination is exemplary for determining a presence of a user interest in the first data group based on the contents of the user operation detected by the terminal device after the first data group in the present invention is transmitted until the transmission request is received. Then, when the system control unit 20 determines that the detail request is not received after the search result page is transmitted until the next result request is received, the system control unit 20 transmits the search result page displaying a larger number of pieces of the display data than the number of pieces of the display data displayed in the previously-transmitted search result page to the user terminal 2.

Therefore, when the user has performed no operation on the display data displayed in the search result page, the number of pieces of display data to be displayed in the search result page to be transmitted next is increased, thereby reducing the operations of requesting the search results of the products which the user is not interested in or the search results which the user does not desire. Thus, the user can efficiently browse the search results. To the contrary, in the conventional shopping server, since the number of displays per page is constant until the user changes, the browsing of the search results is inefficient.

When the system control unit 20 determines that the detail request is not received after the search result page is transmitted until the next result request is received, the system control unit 20 increases the number of pieces of display data displayed in the search result page to be next transmitted by $\beta$ times more than the number of pieces of display data displayed in the previously-transmitted search result page.

Thus, the number of search results per page increases by $\beta$ times, thereby reducing the operations of requesting undesired search results.

Further, each time the next result request is received, when the system control unit 20 determines that the detail request is not received, the system control unit 20 increases the number of pieces of display data displayed in the search result page to be transmitted next more than the number of pieces of display data displayed in the previously-transmitted search result page.

Therefore, the number of search results per page gradually increases, thereby further reducing the operations of requesting the search results of undesired products.

Furthermore, each time the next result request is received, when the system control unit 20 determines that the detail request is not received, the system control unit 20 increases the number of pieces of display data displayed in the search result page to be transmitted next by $\beta$ times more than the display data displayed in the previously-transmitted search result page.

Therefore, the number of search results per page exponentially increases, thereby further reducing the operations of requesting the search results of undesired products.

Furthermore, the system control unit 20 receives the sort request including the sort condition from the user terminal 2, sorts the display priority of the corresponding products with the sort condition, and transmits the search result page displaying the display data of the corresponding products having a successive priority to the corresponding products whose display data is displayed in the previously-transmitted search result page.

Therefore, the search results of the products for which the contents of the sort reference item are the same or relatively similar under the sort condition are collectively displayed on the terminal display. It is inferred that the products having a successive display priority have the similar contents of the item as compared with the products having a non-successive priority. Thus, since the contents of the item of the products whose display data is displayed as the next search results are similar to the contents of the item of the products whose display data is previously displayed as the search results, when a product which the user is interested in or desires is not present in the products whose display data is currently being displayed, it is inferred that the possibility that the product which the user is interested in or desires is not present in the products whose display data is to be displayed next increases. Thus, the operations of requesting the search results of undesired products can be reduced.

When the sort condition is the ascending order of product price, since the search results are displayed in the ascending order of product price, the user who searches the product with reference to a low price can further reduce the operations of requesting the search results of undesired products.

When the sort condition is the descending order of product price, since the search results are displayed in the descending order of product price, the user who searches the product with reference to a high price can further reduce the operations of requesting the search results of undesired products.

Furthermore, the system control unit 20 receives the detail request transmitted from the user terminal 2, transmits the detail page to the user terminal 2 in response to the detail request, receives the search result return request from the user terminal 2, and when receiving the search result return request, transmits the search result page to the user terminal 2. At this time, the system control unit 20 returns the number of pieces of display data displayed in the search result page to be transmitted in response to the search result return request to the initial value of the number of displays.

It is inferred that since the user is interested in or desires the product, the user selects the product link 211, the feedback link 212, the shop link 213 or the comparison button 204 displayed in the search result page to display the detail page. In this case, it is inferred that the user tends to think that the possibility that a product which the user is interested in or desires is present in the user-unselected products among the products whose display data is displayed in the previous search result page is higher than the user does not perform the operation of selecting a link.

Even when the number of displays per page increases one time, if the display returns to the display of the search result page after the detail page is displayed, the number of displays per page is reduced to the initial value, and thus the search results of the product which the user is likely to be interested in or desire can be easily browsed.

Incidentally, in the above-described embodiment, the number of displays exponentially increases, but the form of increase in the number of displays is not limited thereto, for example. For example, the number of displays may increase in proportion to the control counter C. In this case, the system control unit 20 computes, for example, the following equation (2) thereby to calculate the number N of displays in step S57 shown in FIG. 5.

$$N=D+C\times\alpha \qquad (2)$$

Where α is a preset coefficient satisfying α≥1. The coefficient α or β may be changed by a user setting.

Further, the upper limit of the number of displays may be previously set. In other words, the system control unit 20 may control such that the number of displays per page cannot increase beyond the upper limit. The upper limit may be changed by a user setting.

Furthermore, in the above-described embodiment, when the next result link 230 is selected by the user in the search result page, the number of displays per search result page is increased, but for example, the number of displays per search result page may be increased when the link of designating page number is selected as the search result or the link indicating "previous" is selected.

Furthermore, in the above-described embodiment, when the detail page is displayed, the number of displays per search result page is returned to the initial value, but the number of displays per search result page may be reduced smaller than the initial value, for example.

Furthermore, in the above-described embodiment, the operation of displaying the detail page as the user operation of the present invention is assumed as an action on the corresponding product, but other operations for which the user seems to be interested in the corresponding product or the user seems to desire the corresponding product may be assumed as an action on the corresponding product. For example, when the pointer displayed on the screen is being placed on the product link 211 for a predetermined period of time or more in the search result page, the information on the product corresponding to the product link 211 is popup-displayed. The user operation at this time may be assumed as an action on the corresponding product. The operation of only selecting the check box 214 may be assumed as an action on the corresponding product. The operation of registering any in the list of the corresponding products in user favorites may be assumed as an action on the corresponding product. In the actions, for example, when generating the HTML document of the search result page, the system control unit 20 embeds a script for transmitting a notification message (another example of operation notification in the present invention) of notifying the shopping server 1 of the action in the HTML document of the search result page. In the actions, the screen display of the user terminal 2 does not transit to the detail page as in the present embodiment. In this case, when the user selects the next result link 230, for example, the screen display transits to the next search result page. At this time, the number of displays per search result page returns to the initial value.

In the above-described embodiment, when the user selects any product from the corresponding product list 201 in the search result page (step S24), and then selects the button indicating "return" on the Web browser or the button indicating "return" on the product detail page (step S28), the shopping server 1 returns the number of displays to the initial value and transmits the search result page displaying the list of the corresponding products to the user terminal 2 (step S30). However, the present invention is not limited thereto, and for example, when the user selects any product from the corresponding product list 201 in the search result page (step S24) and then selects the button indicating "return" in the Web browser or the button indicating "return" on the product detail page (step S28) and selects "next" or the link to a different page, the information which has not initially displayed for each product (such as product explanation, product feedbacks) may be additionally displayed.

In other words, in the information searching apparatus (the shopping server 1) that searches information in response to a request from the user terminal 2 and transmits the search results to be displayed on the user terminal 2 in units of page to the user terminal 2 via the network, the first data transmitting means may transmit the first data group constituted of the data of the predetermined first item (such as product image, product name and price) as the data group corresponding to the first information group constituted of a predetermined number of pieces of information to the user terminal 2, and when the determining means determines that the user operation has been detected, the second data transmitting means may add the second item (such as product detail information) different from the first item as the item of the data constituting the second data group and may transmit the second data group to the user terminal 2.

Some action on the displayed list of the corresponding products may mean that the user is at least interested in the product subjected to the action. Since an interested product is present, it is inferred that the user tends to think that interesting products other than the product may present. In other words, as compared with no action performed, after the user once takes an action on any product, it is inferred that the user tends to think that the possibility that interesting products are present other than the product subjected to the action increases. In this case, if detailed information is displayed in the search result page to some extent, when the user is interested in a product displayed in the list, the user can obtain the detailed information to some extent without the operation of displaying the detail page. On the other hand, when the detailed information is initially displayed in the search result page, many items of information are displayed even when the user may have no interest, and thus the browsing is complicated, or the vertical length of one page is longer by the additional information thereby to burden the scroll operation. Thus, when the user performs no operation on the display data displayed in the search result page, the number of pieces of display data displayed in the search result page to be next transmitted is increased, thereby reducing the operations of requesting the search results of a product which the user is not interested in or the undesired search results, while when the user performs an operation on the display data displayed in the search result page, the number of items of display data (the amount of information) displayed in the search result page to be next transmitted is increased, and thereby the user can browse a list of detailed information of the products which the user is interested in. Thereby, the user can efficiently browse the search results.

Furthermore, in the above-described embodiment, the information searching apparatus in the present invention is applied to the server device which searches the information on a product to be sold and transmits the search results to the user terminal, but the information searching apparatus in the present invention may be applied to a device for searching information other than the product information. For example, when the information searching apparatus in the present invention is applied to a search engine or the like, information to be searched is Web page, image data, news article or the like. The user operation in this case may be for displaying a searched Web page, for displaying a searched and thumbnail-displayed image in the original size or the like.

Second Embodiment

In the shopping system S according to a second embodiment described below, when an elapsed time after a search result page is displayed until another search result page is displayed (which will be called "elapsed time" below) is a predetermined period of time or less, the number of displays increases.

That a time after a search result page is displayed until another search result page is displayed is short means that a time to browse a list of the corresponding products is short. That the time to browse a list of the corresponding products is short means that the user is not interested in the displayed list of the corresponding products or a product which the user desires is not present therein. In this case, the user selects the next result link 230 to display a different list from the currently-displayed list. At this time, it is inferred that the user tends to think that the possibility that a product which the user is interested in or desires is not present is higher than the possibility that the product is present. In the state of mind, it is inferred that the user tends to browse a list of the corresponding products in a shorter time than initially. In the case, if the number of displays increases, more pieces of information can be browsed in a short time. Further, the number of selections of the next result link 230 can be reduced.

When a product which the user is interested in or a product which the user desires is present in the displayed list of the corresponding products, the user selects the product link 211, the feedback link 212, the shop link 213 or the comparison button 204 to display the detail page. Thereafter, the user may browse a still another search result page. At this time, a time until another search result page is displayed is made longer by the time for which the user browses the detail page. Even when a detail page is not displayed, if an interested product is present in the displayed list of the corresponding products, it is inferred that the user tends to carefully browse the list (browse with time). In such a case, it is inferred that the user tends to think that the possibility that another product which the user is interested in or desires is present is higher than the possibility that the product is not present. In the state of mind, it is inferred that when browsing another search result page, the user tends to browse a list of the corresponding products in the same period of time as initially or in a longer time than initially. In the case, the number of displays does not need to be increased. This is because since the ratio of the time to select the next result link 230 decreases in the entire time required to browse the search results, it is assumed that no influence is caused even when the number of selections of the next result link 230 is not reduced. Further, when the user browses the list of products with time, it is assumed that the number of displays is not increased and accordingly the user can easily browse.

Incidentally, even when a detail page is browsed by the user, a time until another search result page is displayed may be short. Also in this case, the number of displays increases. In this case, since the time for which the user browses the detail page is short, it may be inferred that the user is not interested in the product whose detail page is displayed.

A time as a threshold for determining whether to increase the number of displays is called a threshold time. The threshold time is previously set. How long to set the threshold time is optional, but it is better that a subject actually utilizes the shopping system S and the time is decided based on the result of the subjective experiment or the like. The threshold time may be changed by a user setting. In the shopping system S, the threshold time is made longer in proportion to the number of displays per search result page. This is for addressing that the time for which the user browses the search results becomes longer depending on the number of displays.

Since the elapsed time needs to be counted by the shopping server 1, the elapsed time actually counted in the present embodiment is a time after the shopping server 1 transmits the search result page until the shopping server 1 receives a request of another search result page from the user terminal 2 having received the search result page.

The operational outline of the shopping system S for controlling the number of displays in a search result page will be described below.

Figure 6:
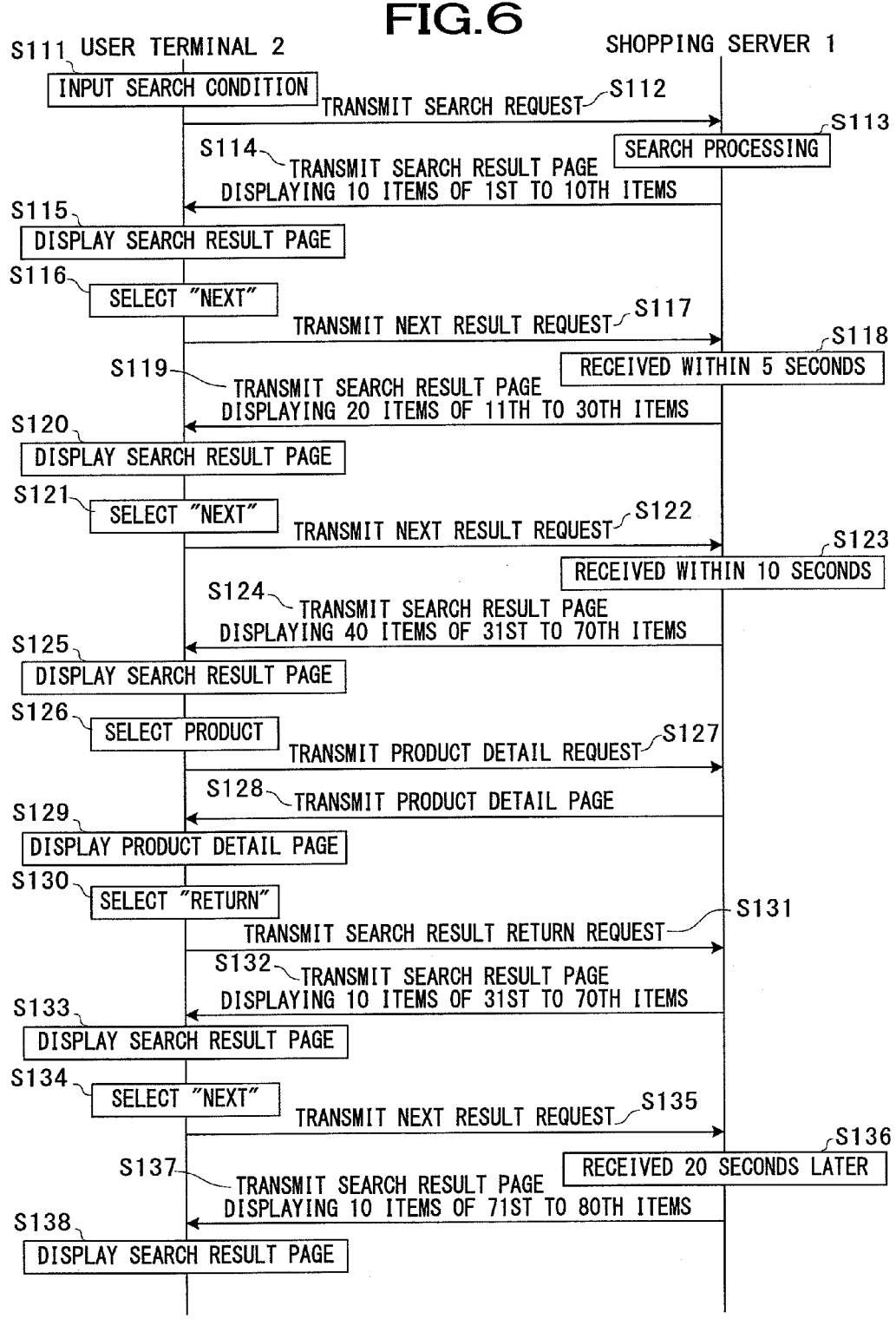
FIG. 6 is a sequence diagram showing a processing example of the shopping system S according to one embodiment.

FIG. 6 is a sequence diagram showing a processing example of the shopping system S according to the present embodiment. FIG. 6 shows the processing example when the initial value of the number of displays is 10 and the number of displays increases by twofold. Further, FIG. 6 shows the processing example when the threshold time is set at five seconds per ten displays.

As shown in FIG. 6, the user inputs a search condition on the user terminal 2 (step S111). The search condition is, for example, a keyword, a range of product price, a category to which the product belongs, or the like. The sort condition may also be selected at this time. Then, the user terminal 2 transmits a search request including the input search condition to the shopping server 1 (step S112).

The shipping server 1 performs a search processing based on the search condition included in the received search request (step S113). Then, the shopping server 1 transmits a search result page displaying a list of ten corresponding products of the first item to the tenth item to the user terminal 2 (step S114). The user terminal 2 displays the received search result page (step S115).

When the user selects the next result link 230 (step S116), the user terminal 2 which has detected the operation transmits a next result request (an example of a transmission request in the present invention) to the shopping server 1 (step S117).

When the shopping server 1 determines that the next result request has been received within five seconds after the transmission of the search result page in step S114 (step S118), the shopping server 1 transmits a search result page displaying a list of 20 corresponding products of the 11th item to the 30th item to the user terminal 2 (step S119). In other words, the shopping server 1 increases the number of displays. The user terminal 2 displays the received search result page (step S120).

When the user further selects the next result link 230 (step S121), the user terminal 2 which has detected the operation transmits a next result request to the shopping server 1 (step S122). When the shopping server 1 determines that the next result request has been received within ten seconds after the transmission of the search result page in step S119 (step S123), the shopping server 1 transmits a search result page displaying a list of 40 corresponding products of the 31st item to the 70th item to the user terminal 2 (step S124). In other words, the shopping server 1 further increases the number of displays. The user terminal 2 displays the received search result page (step S125).

When the user selects the product link 211 of any product such as the 35th item from the corresponding product list 201 in the search result page (step S126), the user terminal 2 which has detected the operation transmits a product detail request to the shopping server 1 (step S127). Then, the shopping server 1 transmits a product detail page corresponding to the product detail request to the user terminal 2 (step S128). The user terminal 2 displays the received product detail page (step S129).

When the user selects the button indicating "return" on the Web browser or the button indicating "return" on the product detail page (step S130), the user terminal 2 which has detected the operation transmits a search result return request to the shopping server 1 (step S131). Then, the shopping server 1 transmits a search result page (the search result page displaying a list of 40 corresponding products from the 31st item to the 70th item) having the same contents as the search result page transmitted in step S124 to the user terminal 2 (step S132). The user terminal 2 displays the received search result page (step S133).

When the user selects the next result link 230 (step S134), the user terminal 2 which has detected the operation transmits a next result request to the shopping server 1 (step S135). When the shopping server 1 determines that the next result request has been received 20 seconds after the transmission of the search result page in step S124 (not in step S132) (step S136), the shopping server 1 transmits a search result page displaying a list of ten corresponding products of the 71st item to the 80th item to the user terminal 2 (step S137). In other words, the shopping server returns the number of displays to the initial value. The user terminal 2 displays the received search result page (step S138).

The operations of the shopping system S will be described using FIG. 7.

Figure 7:
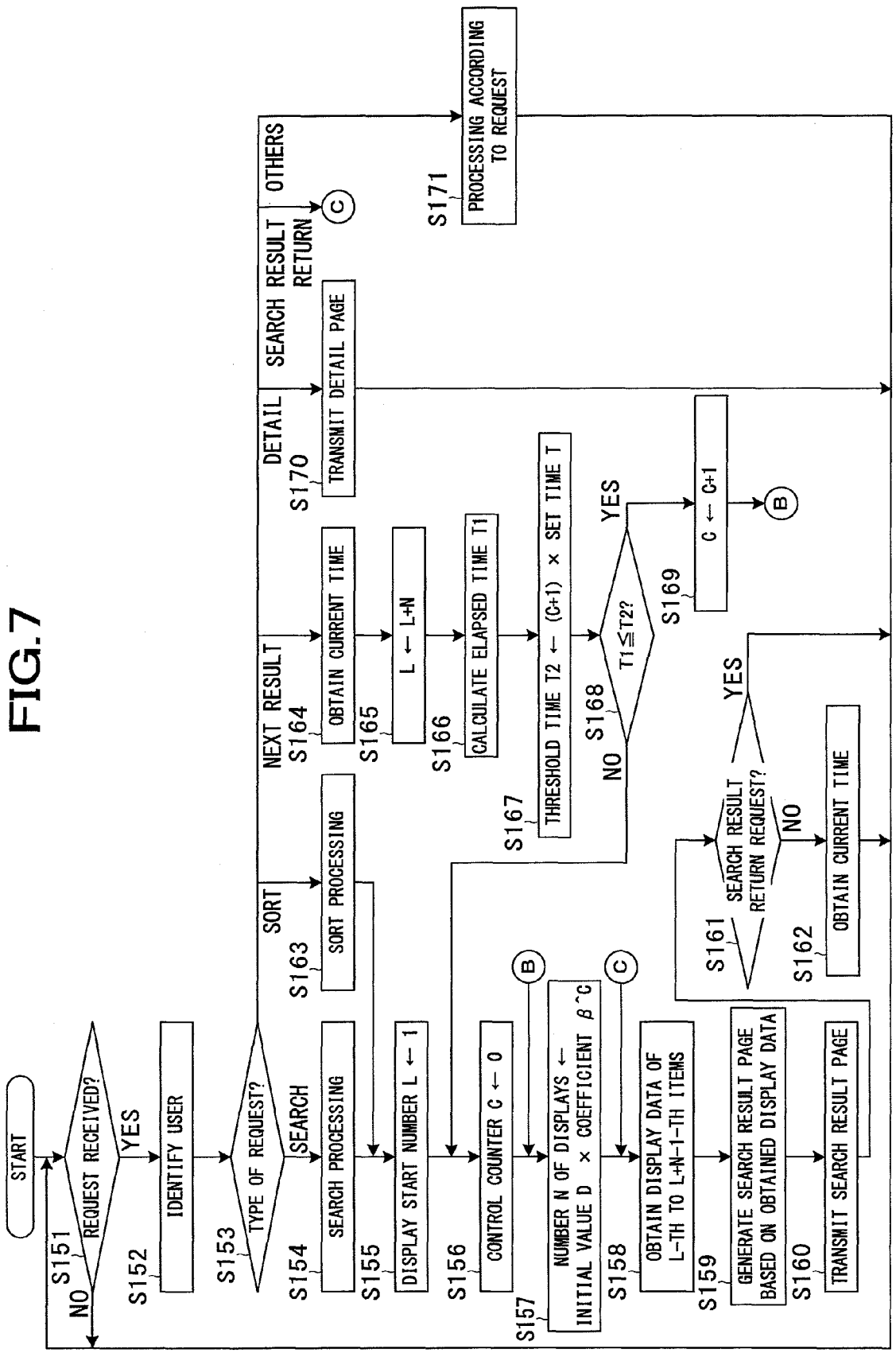
FIG. 7 is a flowchart showing a processing example of the system control unit 20 of the shopping server 1 according to the embodiment.

FIG. 7 is a flowchart showing a processing example of the system control unit 20 of the shopping server 1 according to the present embodiment. The processing of FIG. 7 starts, for example, when the shopping server 1 enters a waiting state for a request from the user terminal 2.

At first, the system control unit 20 determines whether the system control unit 20 has received a request from the user terminal 2 (step S151). At this time, when the system control unit 20 has not received a request (step S151: NO), the system control unit 20 performs the determination processing in step S151 again.

On the other hand, when he system control unit 20 has received a request from the user terminal 2 (step S151: YES), the system control unit 20 identifies the user of the user terminal 2 which has transmitted the received request (step S152). The processing contents in step S152 are the same as the processing in step S52 shown in FIG. 5.

After identifying the user, the system control unit 20 determines a type of the received request (step S153). At this time, when the received request is the search request (step S153: SEARCH), the system control unit 20 performs the search processing (step S154). The processing contents in step S155 are the same as the processing in step S54 shown in FIG. 5.

When finishing the search processing, the system control unit 20 initializes variables included in session information of the identified user. Specifically, the system control unit 20 sets the display start number L to 1 (step S155). Also, the system control unit 20 sets the control counter C to 0 (step S156). The display start number L indicates a product number of the head product in the list of the corresponding products displayed in the search result page. The product number indicates a display priority when the search results are sorted. The smaller value of the number indicates the higher priority. The control counter C indicates the number of times when the elapsed time lowers the threshold time.

After initializing the variables, the system control unit 20 calculates the number N of displays per search result page (step S157). The processing contents in step S157 are same as the processing in step S57 shown in FIG. 5.

After calculating the number N of displays, the system control unit 20 obtains display data of the L-th product to the L+N−1-th product (an example of data displayed when product information is searched in the present invention) from the shop DB 102 and the product DB 103 according to the display priority based on the product ID set in the generated list (step S158). The product display data is information displayed in the search result page, and is specifically image, product name, price, shop name and the like. Next, the system control unit 20 generates a HTML document of the search result page based on the obtained displayed data (step S159). Next, the system control unit 20 transmits the generated HTML document of the search result page to the user terminal 2 which has transmitted the request (step S160). Next, the system control unit 20 determines whether the received request is the search result return request (step S161). At this time, when the received request is not the search result return request (step S161: NO), the system control unit 20 obtains a current time as the transmission time of the search result page (step S162). When the received request is the search result return request (step S161: YES) or when the system control unit 20 finishes the processing in step S162, the system control unit 20 proceeds to step S151.

In step S153, when the received request is the sort request (step S153: SORT), the system control unit 20 performs the sort processing (step S163). The processing contents in step S163 are the same as the processing in step S61 shown in FIG. 5.

In step S153, when the received request is the next result request (step S153: NEXT RESULT), the system control unit 20 obtains a current time as the reception time of the next result request (step S164). When the next result link 230 is selected, the next result request is transmitted from the user terminal 2. Next, the system control unit 20 adds the number N of displays to the display start number L (step S165).

Next, the system control unit 20 calculates an elapsed time T1 from the transmission of the search result page to the reception of the next result request based on the obtained times in step S162 and in step S164 (step S166). The elapsed time T1 is a time obtained by subtracting the transmission time of the search result page obtained in step S162 from the reception time of the next result request obtained in step 164. In other words, in the present embodiment, the time when the system control unit 20 (the first data transmitting means) transmits the search result page (the first data group) to the user terminal 2 is used as the start time of the elapsed time. Next, the system control unit 20 calculates a threshold time T2 (step S167). Specifically, the system control unit 20 calculates the following equation (3).

$$T2 = (C+1) \times T \tag{3}$$

Where T is a set time preset as the threshold time per D displays.

Next, the system control unit 20 determines whether the elapsed time T1 is equal to the threshold time T2 or less (step S168). At this time, when the elapsed time T1 is greater than the threshold time T2 (step S168: NO), the system control unit 20 proceeds to step S156. In other words, the system control unit 20 returns the number of displays per page to the initial value and transmits the search result page to the user terminal 2.

On the other hand, when the elapsed time T1 is equal to the threshold time T2 or less (step S168: YES), the system control unit 20 adds 1 to the control counter C (step S169) and proceeds to step S157. In other words, the system control unit 20 increases the number of displays per page by $\beta$ times more than the previous display, and transmits the search result page to the user terminal 2.

In step S153, when the received request is the detail request (step S153: DETAIL), the system control unit 20 transmits the detail page corresponding to the received request to the user terminal 2 which has transmitted the request (step 70). After finishing the processing, the system control unit 20 proceeds to step S151.

In step S153, when the received request is the search result return request (step S153: SEARCH RESULT RETURN), the system control unit 20 proceeds to step S158. The system control unit 20 which has proceeded to step S158 transmits, to the user terminal 2, the search result page having the same contents as the search result page transmitted before transmitting the detail page. At this time, the system control unit 20 does not obtain the current time in step S162.

In step S153, when the received request is not any of the search request, the sort request, the next result request, the detail request and the search result return request (step S153: OTHERS), the system control unit 20 performs a processing in response to the received request (step S171) and proceeds to step S151.

As described above, according to the present embodiment, the system control unit 20 of the shopping server 1 searches the information of the products meeting the search condition from among the information of the products including the display data, which is the information on plural products whose data is registered in the product DB 103 constructed in the storage unit 15, transmits the search result page displaying display data for the pieces corresponding to the initial value of the number of displays among the display data corresponding to the information of the searched products to the user terminal 2, receives the next result request of requesting data other than the display data displayed in the search result page from the user terminal 2, and transmits the search result page displaying display data different from the display data displayed in the previously-transmitted search result page to the user terminal in response to the next result request. Further, the system control unit 20 determines whether the elapsed time from the transmission of the search result page to the reception of the next result request is the threshold time or less. The determination is exemplary for determining the presence of the user interest in the first data group based on the contents of the user operation detected by the terminal device after the first data group in the present invention is transmitted until the transmission request is received. Then, when the system control unit 20 determines that the elapsed time is equal to the threshold time or less, the system control unit 20 transmits the search result page displaying a larger number of pieces of display data than the number of pieces of the display data displayed in the previously-transmitted search result page to the user terminal 2.

Thus, the number of pieces of display data displayed in the search result page to be next transmitted is increased, thereby reducing the operations of requesting the search results of the products which the user has no interest in or the undesired search results. Thus, the user can efficiently browse the search results. On the contrary, in the conventional shopping server, since the number of displays per page is constant until the user changes, the browsing of the search results is inefficient.

When the system control unit 20 determines that the elapsed time is equal to the threshold time or less, the system control unit 20 increases the number of pieces of display data displayed in the search result page to be next transmitted by $\beta$ times more than the number of pieces of display data displayed in the previously-transmitted search result page.

Therefore, the number of search results per page is increased by $\beta$ times, thereby reducing the operations of requesting undesired search results.

Further, each time the next result request is received, when the system control unit 20 determines that the elapsed time is equal to the threshold time or less, the system control unit 20 increases the number of pieces of display data displayed in the search result page to be next transmitted than the number of pieces of display data displayed in the previously-transmitted search result page.

Therefore, the number of search results per page gradually increases, thereby further reducing the operations of requesting the search results of undesired products.

Further, each time the next result request is received, when the system control unit 20 determines that the elapsed time is equal to the threshold time or less, the system control unit 20 increases the number of pieces of display data displayed in the search result page to be next transmitted by $\beta$ times more than the display data displayed in the previously-transmitted search result page.

Therefore, the number of search results per page exponentially increases, thereby further reducing the operations of requesting the search results of undesired products.

Furthermore, the system control unit 20 receives the sort request including the sort condition from the user terminal 2, sorts the display priority of the corresponding products under the sort condition, and transmits the search result page displaying the display data of the corresponding products having a successive priority to the corresponding products whose display data is displayed in the previously-transmitted search result page.

Therefore, the operations of requesting the search results of undesired products can be further reduced.

When the sort condition is the ascending order of product price, since the search results are displayed in the ascending order of product price, the user who searches a product with reference to a low price can further reduce the operations of requesting the search results of undesired products.

When the sort condition is the descending order of product price, since the search results are displayed in the descending order of product price, the user who searches a product with reference to a high price can further reduce the operations of requesting the search results of undesired products.

Furthermore, since the threshold time used for the determination is proportional to the number of displays per page, the system control unit 20 can accurately make a determination as to whether to increase the number of displays.

Third Embodiment

In the second embodiment, the time after the shopping server 1 transmits a search result page until the shopping server 1 receives a request of another search result page from the user terminal 2 having received the search result page is assumed as the elapsed time to be compared with the threshold time. In a third embodiment described later, a time after the user terminal 2 having received the search result page completes the processing of displaying the search result page until a request of another search result page is received from the user terminal 2 is assumed as the elapsed time.

For example, a time required to transmit a search request and to receive the search result page may change depending on a traffic situation in the network NW. A time required to display the search result page may change depending on the processing capacity of the user terminal 2. In the case, the time after the shopping server 1 transmits the search result page until the search result page is displayed on the user terminal 2 may influence a determination for increasing the number of displays per search result page. Thus, the elapsed time counting start timing is assumed as timing when the processing of displaying the search result page is completed, thereby eliminating the influence.

Specifically, when generating the search result page, the shopping server 1 embeds the script for causing the user terminal 2 to obtain a time when the display of the search result page is completed in the HTML document of the search result page. For example, onload attribute is described in body tag of the HTML document, thereby executing the script at the timing when the display of the search result page is completed. Then, for example, the script is described such that the user terminal 2 obtains a time when the script starts being executed and the obtained time is included in the request to be transmitted to the shopping server 1. The shopping server 1 can calculate the elapsed time based on the time included in the received request. When the display of the search result page is completed, the user terminal 2 may transmit a notification message to the shopping server 1. In this case, the shopping server 1 assumes the time from the reception of the notification message to the reception of the next result request as the elapsed time.

Figure 8:
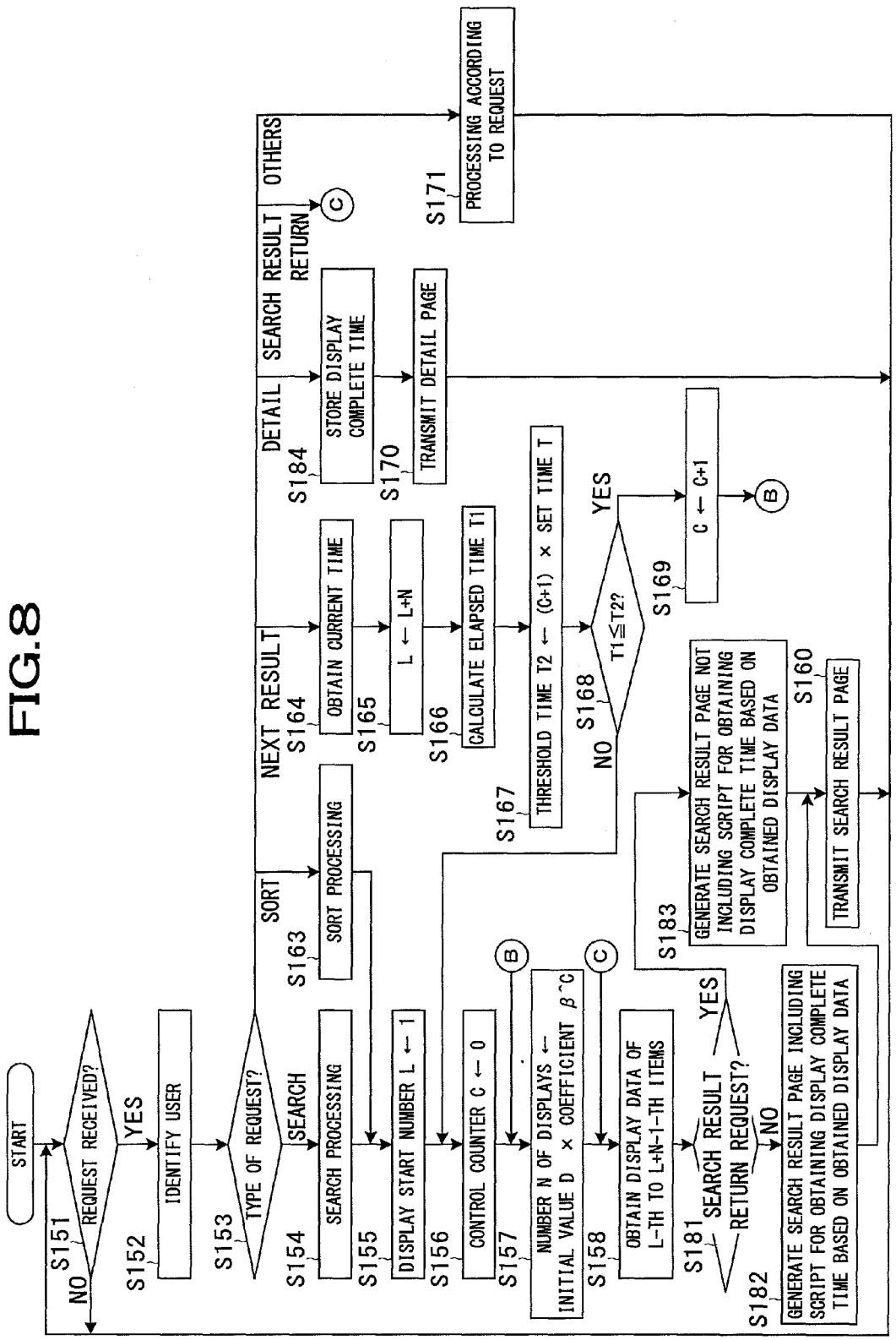
FIG. 8 is a flowchart showing a processing example of the system control unit 20 of the shopping server 1 according to the embodiment.

FIG. 8 is a flowchart showing a processing example of the system control unit 20 of the shopping server 1 according to the present embodiment, and in the figure, the processings identical to those in FIG. 7 are denoted with the same step numbers.

After obtaining the display data from the shop DB 102 and the product DB 103 in step S158, the system control unit 20 determines whether the received request is the search result return request (step S181). At this time, when the received request is not the search result return request (step S181: NO), the system control unit 20 generates the HTML document of the search result page based on the obtained display data (step S182). Here, the system control unit 20 embeds a script for obtaining the time when the display of the search result page is completed in the HTML document of the search result page. On the other hand, when the received request is the search result return request (step S181: YES), the system control unit 20 also generates the HTML document of the search result page based on the obtained display data (step S183). But the system control unit 20 does not embed the script for obtaining the time when the display of the search result page is completed in the HTML document of the search result page. Then, After finishing the processing in step S182 or S183, the system control unit 20 transmits the generated HTML document of the search result page to the user terminal 2 having transmitted the request (step S160).

After receiving the HTML document of the search result page, the user terminal 2 analyzes the HTML document and performs the processing of displaying the search result page. Here, when the script for obtaining the time when the display of the search result page is completed is included in the HTML document, the user terminal 2 executes the script when the processing of displaying the search result page is completed, and obtains a current time as the display complete time. Then, when the next result link 230 is selected by the user, the user terminal 2 transmits the next result request including the obtained display complete time to the shopping server 1. Alternatively, when the user previously selects the product link 211, the feedback link 212, the shop link 213 or the comparison button 204, the user terminal 2 transmits the detail request including the obtained display complete time to the shopping server 1.

When receiving the detail request (step S153: DETAIL), the system control unit 20 in the shopping server 1 stores the display complete time included in the detail request (step S184). Then, the system control unit 20 transmits the detail page to the user terminal 2 (step S170). When receiving the next result request (step S153: NEXT RESULT), the system control unit 20 calculates the elapsed time T1 (step S166). At this time, when the time when the display of the search result page is completed is included in the next result request, the system control unit 20 calculates the elapsed time T1 based on the display complete time. On the other hand, when the time when the display of the search result page is completed is not included in the next result request, the system control unit 20 calculates the elapsed time T1 based on the stored display complete time when receiving the detail request. The elapsed time T1 is a time obtained by subtracting the time when the display of the search result page is completed included in the next result request obtained in step S153 or the time when the display of the search result page is completed stored in step S84 from the time when the next result request is received obtained in step S164. In other words, in the present embodiment, the time when the user terminal 2 completes the processing of displaying the search result page (the first data group) is used as the start time of the elapsed time.

As described above, according to the present embodiment, since the system control unit 20 determines whether the elapsed time from the completion of the processing of display the search result page by the user terminal 2 to the reception of the next result request is equal to the threshold time or less, the time for which the user browses the search results can be accurately determined.

Incidentally, the number of displays exponentially increases in the second and the third embodiments, but the form of increase in the number of displays is not limited thereto, for example. For example, the number of displays may increase in proportion to the control counter C. In this case, the system control unit 20 calculates the above equation (2) in step S157 shown in FIG. 7, thereby to calculate the number N of displays.

Furthermore, the upper limit of the number of displays may be previously set. In other words, the system control unit 20 may control such that the number of displays per page does not increase beyond the upper limit. The upper limit may be changed by a user setting.

Furthermore, the second and the third embodiments, when the next result link 230 is selected in the search result page by the user, the number of displays per search result page is increased, but for example, the number of displays per search result page may be increased when the link of designating page number is selected as the search result or the link indicating "previous" is selected.

Furthermore, in the second and the third embodiments, as the number of displays per search result page increases, the threshold time becomes longer in proportion to the number of displays, but the threshold time may not be proportional to the number of displays. The threshold time may be constant irrespective of the number of displays per search result page.

In the second and the third embodiments, when the shopping server 1 determines that the threshold time has elapsed after the transmission of the search result page in step S124 and then the next result request has been received (step S136), the shopping server 1 transmits the search result page displaying a list of the corresponding products as many as the number of displays returned to the initial value to the user terminal 2 (step S137). However, the present invention is not limited to the embodiments, and for example, when the shopping server 1 determines that the threshold time has been elapsed after the transmission of the search result page in step S114, S119 or S124 and then the next result request has been received, the information which has not initially displayed for each product (such as product explanation, product feedbacks) may be additionally displayed.

In other words, in the information searching apparatus (the shopping server 1) that searches information in response to a request from the user terminal 2 and transmits the search results to be displayed on the user terminal 2 in units of page to the user terminal 2 via the network, the first data transmitting means may transmit the first data group constituted of the data of the predetermined first item (such as product image, product name and price) as the data group corresponding to the first information group constituted of a predetermined number of pieces of information to the user terminal 2, and when the determining means determines that the elapsed time exceeds the threshold time, the second data transmitting means may add the second item (such as product detail information) different from the first item as the item of the data constituting the second data group and may transmit the second data group to the user terminal 2.

That the elapsed time from the transmission of the first data to the reception of the transmission request exceeds the threshold time may mean that the user having browsed over the threshold time is at least interested in the displayed search results. It is inferred that since an interested product is present, the user tends to think that interesting products other than the product may be present. In other words, when the user browses the search result page beyond the threshold time, it is inferred that the possibility that the user thinks that a product which the user is interested in is present is high than when the user requests the next information within the threshold time. In this case, if detailed information is displayed in the search result page to some extent, when the user is interested in a product displayed in the list, the user can obtain the detailed information to some extent without the operation of displaying the detail page. On the other hand, when the detailed information is initially displayed in the search result page, many items of information are displayed even when the user may have no interest, and thus the browsing is complicated, or the vertical length of one page is longer by the additional information thereby to burden the scroll operation. Thus, when the user requests different information on the display data displayed in the search result page within the threshold time, the number of pieces of display data displayed in the search result page to be next transmitted is increased, thereby reducing the operations of requesting the search results of the product which the user is not interested in or the undesired search results, while when the user requests different information on the display data displayed in the search result page beyond the threshold time, the number of items of display data (the amount of information) displayed in the search result page to be next transmitted is increased, and thereby the user can browse a list of detailed information of the products which the user is interested in. Thereby, the user can efficiently browse the search results.

Furthermore, in the second and the third embodiments, the information searching apparatus in the present invention is applied to the server device which searches the information on products to be sold and transmits the search results to the user terminal, but the information searching apparatus in the present invention may be applied to a device for searching information other than the product information. For example, when the information searching apparatus in the present invention is applied to a search engine or the like, information to be searched is Web page, image data, news articles or the like.

DESCRIPTION OF REFERENCE NUMERALS

1: Shopping server
2: User terminal
11: Operation unit
12: Display unit
13: Communication unit
14: Drive unit
15: Storage unit
16: Input/output interface unit
17: CPU
18: ROM
19: RAM
20: System control unit
21: System bus
101: Member DB
102: Shop DB
103: Product DB
104: Member usage DB
NW: Network
S: Shopping system

The invention claimed is:

1. An information searching apparatus that searches information in response to a request from a terminal device and transmits search results to be displayed on the terminal device in unit of page to the terminal device via a network, comprising:
   a search condition receiving unit that receives a search condition transmitted from the terminal device;
   a searching unit that searches an information group meeting the search condition from a plurality of pieces of information for which data is stored in a data storage unit storing, in correspondence to each piece of the information, the data displayed as data about the information when the information is searched;
   a first data transmitting unit that transmits, to the terminal device, a first data group constituted of a predetermined number of pieces of the data in a data group which is the data corresponding to the information group searched by the searching unit;

a data request receiving unit that receives a transmission request of the data different from the first data group from the terminal device;

a second data transmitting unit that transmits, to the terminal device, a second data group different from the first data group in the data group corresponding to the information group searched by the searching unit in response to the transmission request received by the data request receiving unit; and a determining unit that determines a presence of a user interest in the first data group based on contents of a user operation detected by the terminal device after the first data group is transmitted until the transmission request is received, wherein when the determining unit determines that the user is not interested in the first data group, the second data transmitting unit transmits the second data group constituted of a larger number of pieces of the data than the number of pieces of the data constituting the first data group.

2. The information searching apparatus according to claim 1, wherein the determining unit determines whether a user operation on the data constituting the first data group is detected by the terminal device after the first data group is transmitted until the transmission request is received, and the second data transmitting unit transmits the second data group constituted of a larger number of pieces of the data than the number of pieces of the data constituting the first data group when the determining unit determines that the user operation is not detected.

3. The information searching apparatus according to claim 1, wherein the determining unit determines whether an elapsed time after the first data group is transmitted until the transmission request is received is equal to a predetermined threshold time or less, and the second data transmitting unit transmits the second data group constituted of a larger number of pieces of the data than the number of pieces of the data constituting the first data group when the determining unit determines that the elapsed time is equal to the threshold time or less.

4. The information searching apparatus according to claim 1, wherein the second data transmitting unit increases the number of pieces of the data constituting the second data group by $\alpha$ pieces (where, $\alpha \geq 1$) more than the number of pieces of the data constituting the first data group when the determining unit determines that the user is not interested in the first data group.

5. The information searching apparatus according to claim 4, wherein the data request receiving unit receives a transmission request of the data different from the transmitted second data group from the terminal device, the second data transmitting unit transmits, as the new second data group, a data group different from the previously-transmitted second data group to the terminal device when the transmission request of the data different from the second data group is received, the determining unit determines a presence of a user interest in the second data group based on contents of a user operation detected by the terminal device after the second data group is transmitted until the transmission request is received, and the second data transmitting unit increases the number of pieces of the data constituting the second data group to be next transmitted by a pieces more than the number of pieces of the data constituting the previously-transmitted second data group when the determining unit determines that the user is not interested in the second data group.

6. The information searching apparatus according to claim 1, wherein the second data transmitting unit increases the number of pieces of the data constituting the second data group by $\beta$ times (where, ($\beta>1$) more than the number of pieces of the data constituting the first data group when the determining unit determines that the user is not interested in the first data group.

7. The information searching apparatus according to claim 6, wherein the data request receiving unit receives a transmission request of the data different from the transmitted second data group from the terminal device, the second data transmitting unit transmits, as the new second data group, a data group different from the previously-transmitted second data group to the terminal device when the transmission request of the data different from the second data group is received, the determining unit determines a presence of a user interest in the second data group based on contents of a user operation detected by the terminal device after the second data group is transmitted until the transmission request is received, and the second data transmitting unit increases the number of pieces of the data constituting the second data group to be next transmitted by $\beta$ times more than the number of pieces of the data constituting the previously-transmitted second data group when the determining unit determines that the user is not interested in the second data group.

8. The information searching apparatus according to claim 1, further comprising:

a sort condition receiving unit that receives a sort condition transmitted from the terminal device; and a sorting unit that sorts an arrangement order of the information in the information group searched by the searching unit under the sort condition, wherein the second data transmitting unit assumes, as the second data group, a data group of which the arrangement order of the information sorted by the sorting unit is successive to that of the first data group.

9. The information searching apparatus according to claim 7, wherein the searching unit searches product information, and the sort condition is an ascending order of product price.

10. The information searching apparatus according to claim 8, wherein the searching unit searches product information, and the sort condition is a descending order of product price.

11. The information searching apparatus according to claim 1, wherein the data request receiving unit receives a transmission request of the data different from the transmitted second data group from the terminal device, the second data transmitting unit transmits, as the new second data group, a data group different from the previously-transmitted second data group to the terminal device when the transmission request of the data different from the second data group is received, the determining unit determines a presence of a user interest in the second data group based on contents of a user operation detected by the terminal device after the second data group is transmitted until the transmission request is received, and the second data transmitting unit increases the number of pieces of the data constituting the second data group to be next transmitted more than the number of pieces of the data constituting the previously-transmitted second data group when the determining unit determines that the user is not interested in the second data group.

12. The information searching apparatus according to claim 2, wherein the data request receiving unit receives a transmission request of the data different from the transmitted second data group from the terminal device, the second data transmitting unit transmits, as the new second data group, a data group different from the previously-transmitted second data group to the terminal device when the transmission request of the data different from the second data group is received, the determining unit determines whether a user operation on the data constituting the second data group is detected by the terminal device after the second data group is transmitted until the transmission request is received, and the second data transmitting unit increases the number of pieces of the data constituting the second data group to be next transmitted more than the number of pieces of the data constituting the previously-transmitted second data group when the determining unit determines that the user operation on the data constituting the second data group is not detected, the information searching apparatus further comprising:

an information display request receiving unit that, when an information display request is transmitted from the terminal device in response to the detected user operation of displaying the information corresponding to the data constituting the second data group, receives the information display request;

an information transmitting unit that transmits the information corresponding to the data selected by the user operation to the terminal device in response to the information display request received by the information display request receiving unit; and a return request receiving unit that receives a return request of returning to the display of the search results from the terminal device having received the information transmitted from the information transmitting unit, wherein the second data transmitting unit transmits the second data group constituted of a number of pieces of the data equal to or less than the number of pieces of the data constituting the first data group in response to the return request received by the return request receiving unit.

13. The information searching apparatus according to claim 3, wherein the data request receiving unit receives a transmission request of the data different from the transmitted second data group from the terminal device, the second data transmitting unit transmits, as the new second data group, a data group different from the previously-transmitted second data group to the terminal device when the transmission request of the data different from the second data group is received, the determining unit determines whether an elapsed time after the second data group is transmitted until the transmission request is received is a predetermined threshold time or less, the second data transmitting unit increases the number of pieces of the data constituting the second data group to be next transmitted more than the number of pieces of the data constituting the previously-transmitted second data group when the determining unit determines that the elapsed time after the second data group is transmitted until the transmission request is received is equal to the predetermined threshold time or less, and the determining unit makes a determination with longer threshold time as the number of pieces of the second data group transmitted by the second data transmitting unit becomes larger.

14. The information searching apparatus according to claim 3, wherein the elapsed time is a time obtained by assuming a time when the first data transmitting unit transmits a first data group to the terminal device as a time when the first data group is transmitted.

15. The information searching apparatus according to claim 3, wherein the elapsed time is a time obtained by assuming a time when the terminal device having received the first data group completes a processing of displaying the first data group as a time when the first data group is transmitted.

16. A number deciding method, for deciding the number of search results per page, in an information searching apparatus for searching information in response to a request from a terminal device and transmitting the search results to be displayed on the terminal device in units of page to the terminal device via a network, comprising:

a search condition receiving step of receiving a search condition transmitted from the terminal device;

a searching step of searching an information group meeting the search condition from a plurality of pieces of information for which data is stored in a data storage unit storing, in correspondence to each piece of the information, the data displayed as data about the information when the information is searched;

a first data transmitting step of transmitting, to the terminal device, a first data group constituted of a predetermined number of pieces of the data in a data group which is the data corresponding to the information group searched in the searching step;

a data request receiving step of receiving a transmission request of the data different from the first data group from the terminal device;

a second data transmitting step of transmitting, to the terminal device, a second data group different from the first data group in the data group corresponding to the information group searched in the searching step in response to the transmission request received in the data request receiving step; and a determining step of determining a presence of a user interest in the first data group based on contents of a user operation detected by the terminal device after the first data group is transmitted until the transmission request is received, wherein when it is determined that the user is not interested in the first data group in the determining step, the second data group constituted of a larger number of pieces of the data than the number of pieces of the data constituting the first data group is transmitted in the second data transmitting step.

17. An information searching system comprising:
a terminal device;
an information searching apparatus which searches information in response to a request from the terminal device and transmits search results to be displayed on the terminal device in unit of page to the terminal device via a network; and
a data storage unit which stores, in correspondence to each piece of the information, data displayed as data about the information when the information is searched,
wherein the information searching apparatus comprises:
a search condition receiving unit that receives a search condition transmitted from the terminal device;
a searching unit that searches an information group meeting the search condition from a plurality of pieces of information for which the data is stored in the data storage unit;
a first data transmitting unit that transmits, to the terminal device, a first data group constituted of a predetermined number of pieces of the data in a data group which is the data corresponding to the information group searched by the searching unit;
a data request receiving unit that receives a transmission request of the data different from the first data group from the terminal device;
a second data transmitting unit that transmits, to the terminal device, a second data group different from the first data group in the data group corresponding to the information group searched by the searching unit in response to the transmission request received by the data request receiving unit;
an operation notification receiving unit that receives an operation notification indicating that a user operation on the data constituting the first data group is detected by the terminal device from the terminal device; and
a determining unit that determines a presence of a user interest in the first data group based on contents of a user operation detected by the terminal device after the first data group is transmitted until the transmission request is received, and
the terminal device comprises:
a search condition transmitting unit that transmits the search condition to the information searching apparatus;
a first data receiving unit that receives the first data group transmitted from the information searching apparatus;
a first displaying unit that displays the first data group;
an operation detecting unit that detects the user operation on the data constituting the first data group displayed by the first displaying unit;
an operation notification transmitting unit that transmits the operation notification to the information searching apparatus when the user operation is detected by the operation detecting unit;
a data request transmitting unit that transmits the transmission request to the information searching apparatus when a user operation of requesting to transmit the data different from the first data group is detected;
a second data receiving unit that receives the second data group transmitted from the information searching apparatus; and
a second displaying unit that displays the second data group,
wherein when the determining unit determines that the user is not interested in the first data group, the second data transmitting unit transmits the second data group constituted of a larger number of pieces of the data than the number of pieces of the data constituting the first data group.

18. A non-transitory recording medium in which an information searching program is computer-readably recorded, the program causing a computer included in an information searching apparatus which searches information in response to a request from a terminal device and transmits search results to be displayed on the terminal device in units of page to the terminal device via a network to function as:
a search condition receiving unit that receives a search condition transmitted from the terminal device;
a searching unit that searches an information group meeting the search condition from a plurality of pieces of information for which data is stored in a data storage unit storing, in correspondence to each piece of the information, the data displayed as data about the information when the information is searched;
a first data transmitting unit that transmits, to the terminal device, a first data group constituted of a predetermined number of pieces of the data in a data group which is the data corresponding to the information group searched by the searching unit;
a data request receiving unit that receives a transmission request of the data different from the first data group from the terminal device;
a second data transmitting unit that transmits, to the terminal device, a second data group different from the first data group in the data group corresponding to the information group searched by the searching unit in response to the transmission request received by the data request receiving unit; and
a determining unit that determines a presence of a user interest in the first data group based on contents of a user operation detected by the terminal device after the first data group is transmitted until the transmission request is received,
wherein when the determining unit determines that the user is not interested in the first data group, the program causes the computer as the second data transmitting unit to transmit the second data group constituted of a larger number of pieces of the data than the number of pieces of the data constituting the first data group.

* * * * *